(12) United States Patent
Yumiki et al.

(10) Patent No.: US 9,007,507 B2
(45) Date of Patent: Apr. 14, 2015

(54) CAMERA SYSTEM FOR ADJUSTING DISPLAYED IMAGE ACCORDING TO AN APERTURE VALUE

(71) Applicant: Panasonic Corporation, Osaka (JP)

(72) Inventors: Naoto Yumiki, Osaka (JP); Kaoru Mokunaka, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/457,067

(22) Filed: Aug. 11, 2014

(65) Prior Publication Data

US 2014/0347543 A1    Nov. 27, 2014

Related U.S. Application Data

(62) Division of application No. 12/092,757, filed as application No. PCT/JP2007/061835 on Jun. 12, 2007, now abandoned.

(30) Foreign Application Priority Data

Jun. 20, 2006 (JP) .................................. 2006-170016

(51) Int. Cl.
*H04N 5/232* (2006.01)
*H04N 5/235* (2006.01)
(Continued)

(52) U.S. Cl.
CPC ............... *H04N 5/2353* (2013.01); *G03B 7/02* (2013.01); *G03B 17/18* (2013.01); *H04N 5/23212* (2013.01); *H04N 5/23225* (2013.01); *H04N 5/23245* (2013.01); *H04N 5/23293* (2013.01); *H04N 2101/00* (2013.01)

(58) Field of Classification Search
CPC combination set(s) only.
See application file for complete search history.

(56) References Cited

U.S. PATENT DOCUMENTS 7,405,762 B2    7/2008  Nonaka et al.
7,469,098 B2   12/2008  Ito
(Continued)

FOREIGN PATENT DOCUMENTS

CN    1 519 639 A    8/2004
CN    1 652 577 A    8/2005
(Continued)

OTHER PUBLICATIONS

Japanese Office Action issued in Japanese Patent Application No. 2008-522401 mailed Dec. 11, 2012.
(Continued)

*Primary Examiner* — Gary C Vieaux
(74) *Attorney, Agent, or Firm* — McDermott Will & Emery LLP

(57) ABSTRACT

A camera system includes an imaging optical system, an imaging unit, a reflecting mirror that is in a first state of being positioned in an optical path extending from the imaging optical system to the imaging unit or in a second state of being retracted from the optical path, an aperture adjustment unit, an image adjustment unit, a release button, and a control unit. The imaging unit performs focusing by detecting contrast in an image of the subject, and while the reflecting mirror is kept in the second state, the image adjustment unit increases the brightness of the image on a display when the aperture adjustment unit changes the aperture value of the imaging optical system to a larger aperture value, and by operation of the release button, the imaging unit performs the focusing, and then the photographing of the subject is started.

9 Claims, 17 Drawing Sheets

(51) Int. Cl.
*G03B 7/02* (2006.01)
*G03B 17/18* (2006.01)
*H04N 101/00* (2006.01)

(56) References Cited

U.S. PATENT DOCUMENTS

| | | |
|---|---|---|
| 7,471,330 B2 | 12/2008 | Okawara |
| 7,499,097 B2 | 3/2009 | Onozawa |
| 7,778,539 B2 | 8/2010 | Ito |
| 8,120,664 B2 | 2/2012 | Nozaki et al. |
| 2004/0183939 A1 | 9/2004 | Nonaka et al. |
| 2005/0057660 A1 | 3/2005 | Nonaka et al. |
| 2005/0174451 A1 | 8/2005 | Nozaki et al. |
| 2005/0185083 A1 | 8/2005 | Okawara |
| 2005/0185086 A1 | 8/2005 | Onozawa |
| 2006/0008265 A1 | 1/2006 | Ito |
| 2006/0033831 A1 | 2/2006 | Ejima et al. |
| 2007/0019945 A1 | 1/2007 | Kurosawa |
| 2007/0116450 A1 | 5/2007 | Kijima |
| 2007/0172226 A1 | 7/2007 | Nakata et al. |
| 2009/0074394 A1 | 3/2009 | Ito |
| 2009/0268075 A1 | 10/2009 | Yumiki |
| 2012/0105684 A1 | 5/2012 | Nozaki et al. |

FOREIGN PATENT DOCUMENTS

| | | |
|---|---|---|
| CN | 1 658 058 A | 8/2005 |
| CN | 1 661 458 A | 8/2005 |
| CN | 1 721 970 A | 1/2006 |
| EP | 1 562 368 A2 | 8/2005 |
| JP | 05056342 A | 3/1993 |
| JP | 11-150679 A | 6/1999 |
| JP | 2000-125153 A | 4/2000 |
| JP | 2001-013547 A | 1/2001 |
| JP | 2001-125173 A | 5/2001 |
| JP | 2001-169154 A | 6/2001 |
| JP | 2002-290828 A | 10/2002 |
| JP | 2003-060943 A | 2/2003 |
| JP | 2004-104673 A | 4/2004 |
| JP | 2004-109865 A | 4/2004 |
| JP | 2005-010643 A | 1/2005 |
| JP | 2005-064699 A | 3/2005 |
| JP | 2007-201671 A | 8/2007 |

OTHER PUBLICATIONS

Japanese Office Action issued in Japanese Patent Application No. 2012-006313 mailed Dec. 25, 2012.
Chinese Office Action mailed Jan. 11, 2013 issued in corresponding CN Application No. 201110034965.9.
Chinese Office Action with Full English Translation issued in Chinese Patent Application No. 201110034965.9 dated May 23, 2013.
Chinese Office Action, with English translation, issued in Chinese Patent Application No. 200780022998.3, dated May 12, 2010.
United States Office Action issued in U.S. Appl. No. 12/092,757 dated Sep. 15, 2011.
United States Office Action issued in U.S. Appl. No. 12/092,757 dated May 24, 2011.
United States Office Action issued in U.S. Appl. No. 12/092,757 dated Feb. 23, 2012.
United States Office Action issued in U.S. Appl. No. 12/092,757 dated Aug. 20, 2012.

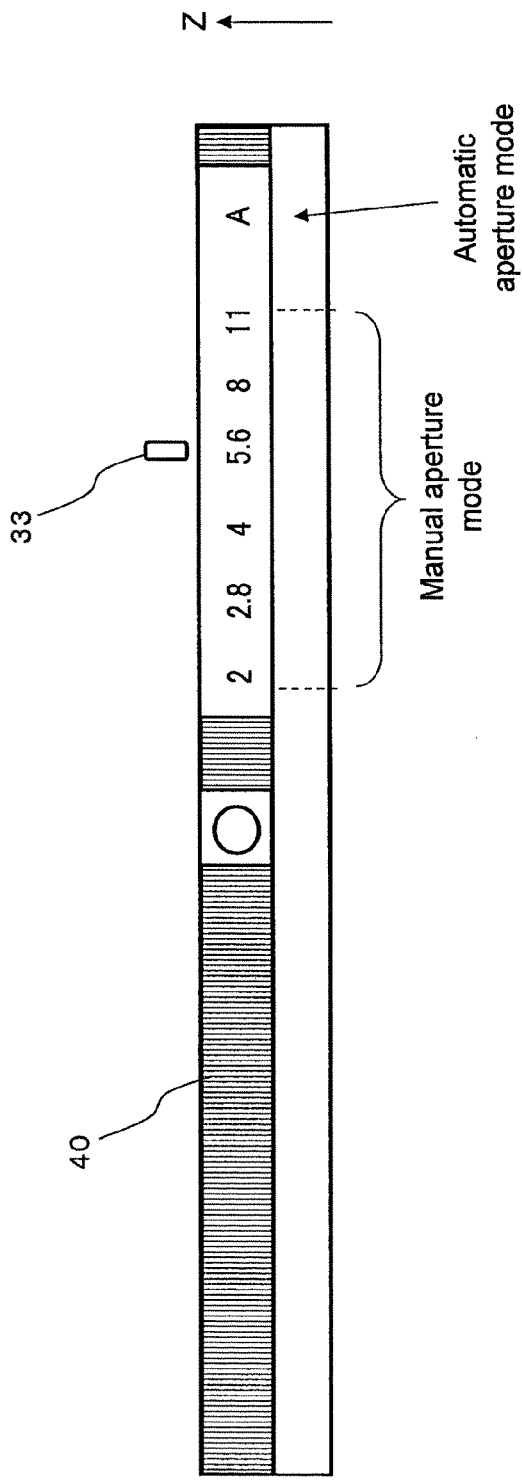
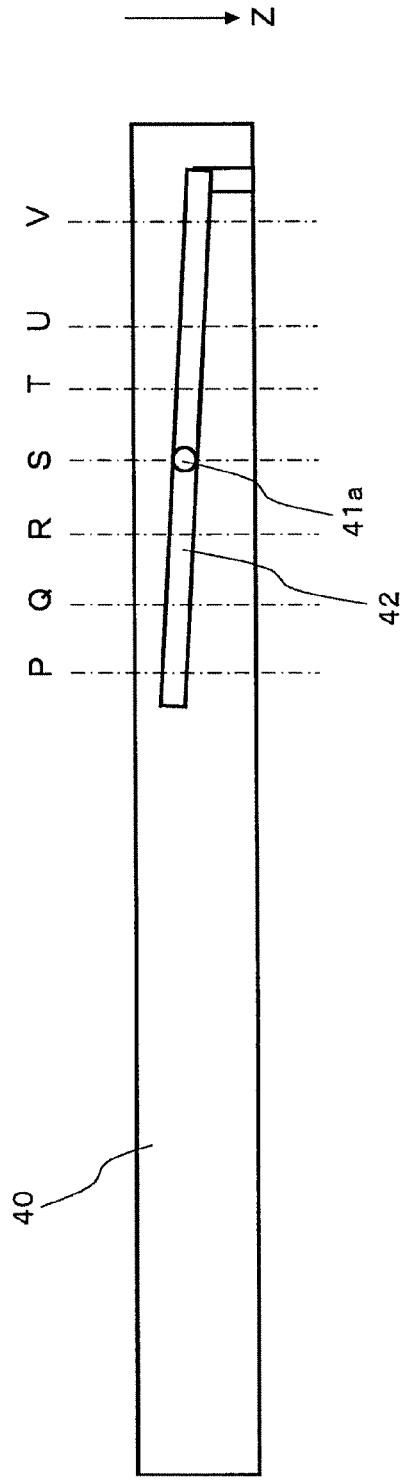
Fig. 6A
Fig. 6B

CAMERA SYSTEM FOR ADJUSTING DISPLAYED IMAGE ACCORDING TO AN APERTURE VALUE

RELATED APPLICATIONS

This application is a Divisional of U.S. patent application Ser. No. 12/092,757, filed on May 6, 2008, which is the U.S. National Phase under 35 U.S.C. §371 of International Application No. PCT/JP2007/061835, filed on Jun. 12, 2007, which in turn claims the benefit of Japanese Application No. 2006-170016, filed on Jun. 20, 2006, the disclosures of which Applications are incorporated by reference herein.

TECHNICAL FIELD

The present invention relates to a camera system, and in particular, relates to a camera system used in a digital camera having an aperture value alteration function.

BACKGROUND ART

Single-lens reflex digital cameras have been rapidly growing in popularity in recent years. With this single-lens reflex digital camera, when observing a subject using an optical viewfinder, the light (or the image of the subject) incident on an imaging optical system is reflected by a reflecting mirror arranged on the optical path, and guided to a viewfinder optical system. As a result, the subject image is converted into an erected image by a pentaprism and the like, and guided to the optical viewfinder. Therefore, a user can observe the subject image formed by the image optical system from the optical viewfinder.

On the other hand, when the imaging optical system is used for photographing, the reflecting mirror is retracted from the photographing optical path. As a result, the viewfinder optical path is switched to the photographing optical path, and the reflecting mirror returns to a fixed position immediately when photographing ends. This system is the same for a conventional silver halide camera or a digital camera, if it is a single-lens reflex system.

However, photographing using an optical viewfinder is extremely difficult for a beginner who is inexperienced with photographing using a digital camera.

Consequently, a camera system having a monitor photographing mode in which it is possible to observe a subject using a liquid crystal display monitor when photographing has been proposed (for example, refer to Patent Document 1). Patent Document 1: Japanese published unexamined application JP2001-125173

DISCLOSURE OF INVENTION

Normally, this kind of camera system has an aperture value alternation function. In the case of the monitor photographing mode, real-time images captured sequentially with the set aperture values are displayed on a display device. Therefore, it is possible to check the depths of field which change according to the aperture value, via the display device.

However, normally, the amount of light incident on the imaging sensor lessens if the aperture value becomes large, and the image displayed on the display device becomes dark. As a result, sometimes it is difficult to check the depth of field with some of the aperture values.

A challenge of the present invention is to improve the convenience at the time of checking the depth of field, in a camera system having the aperture value alteration function.

A camera system according to a first aspect of the present invention is a camera system for photographing a subject, and includes an imaging optical system, an imaging unit, an aperture adjustment unit, a display unit, and an image adjustment unit. The imaging optical system forms an optical image of the subject. The imaging unit converts the optical image into an image signal, and obtains an image of the subject. The aperture adjustment unit can adjust an aperture value of the imaging optical system. The display unit displays the image. The image adjustment unit adjusts the brightness of the image displayed on the display unit according to the aperture value.

In this camera system, when the aperture value is changed, the brightness of the image is adjusted by an image adjustment unit according to the aperture value. As a result, regardless of the aperture value, the brightness of the image displayed can be kept to a degree which verification can be done easily. By doing so, in this camera system, the user can easily check the depths of field of images, without being affected by the difference in the brightness of images due to the difference in the aperture values.

A camera system according to a second aspect of the present invention is the camera system of the first aspect, wherein the image adjustment unit amplifies the image signal according to the aperture value.

A camera system according to a third aspect of the present invention is the camera system of the second aspect, wherein the image adjustment unit amplifies the image signal based on information on the relationship between the aperture value and the amplification factor of the image signal.

A camera system according to a fourth aspect of the present invention is the camera system of the third aspect, further including an aperture value input unit to which the aperture value can be input. The display unit can display a standard image and a comparative image side by side. The standard image is an image obtained with a standard aperture value set in advance in the control unit. The comparative image is an image obtained with a set aperture value set in the aperture value input unit.

A camera system according to a fifth aspect of the present invention is the camera system of the fourth aspect, further including an operation unit to which information can be input from the outside, and an image recording unit for recording the image. The standard image and comparative image are recorded in the image recording unit based on information inputted from the operation unit.

BRIEF DESCRIPTION OF DRAWINGS

FIG. 6A is a an expansion plan of an aperture ring looked from the outside in the radial direction, and FIG. 6B is an expansion plan of the aperture ring looked from the inner side in the radial direction;

EXPLANATION OF REFERENCE

Figure 1:
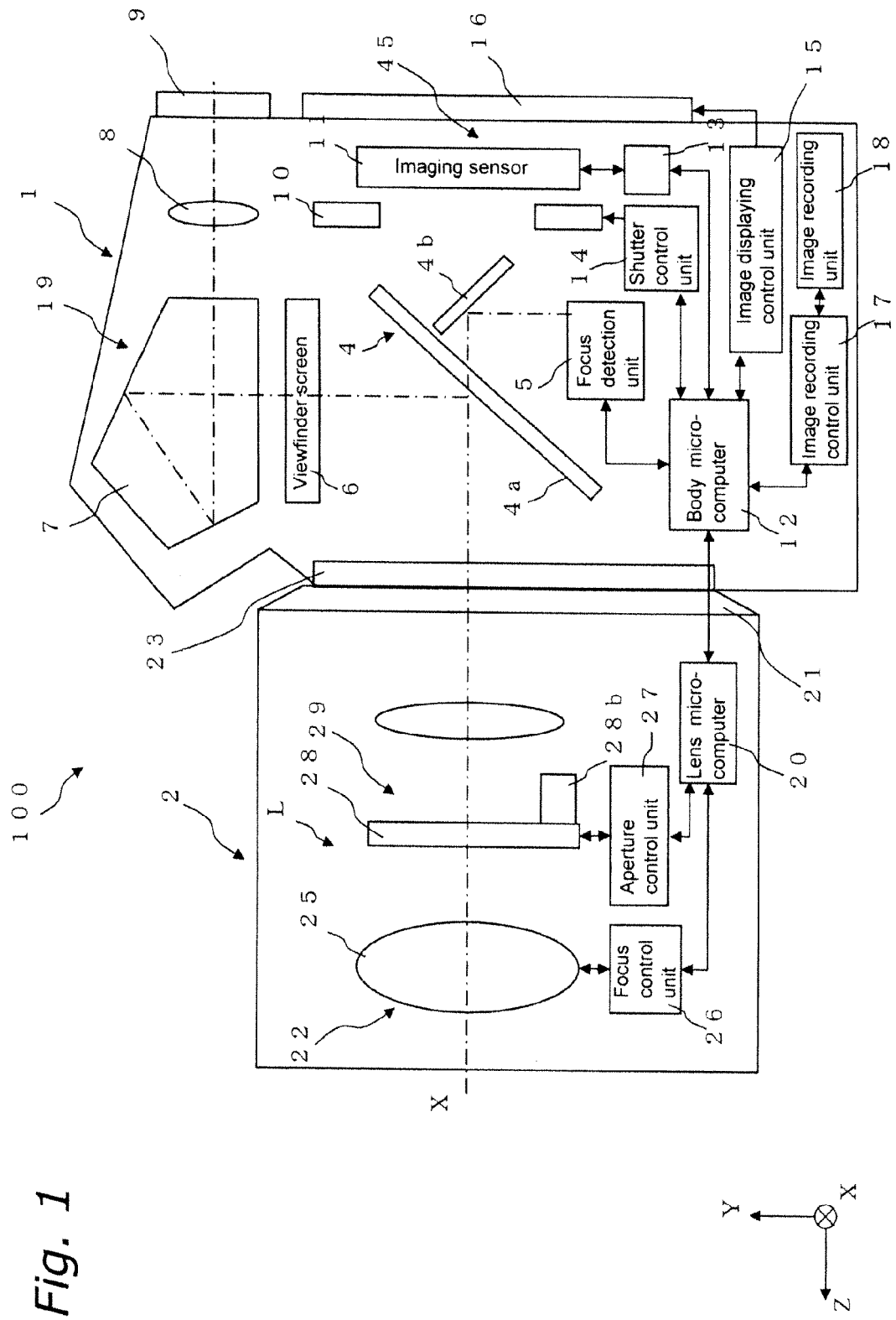
FIG. 1 is an overall configuration diagram of a camera system.

L Imaging optical system
Df Defocus amount
X Optical path
1 Camera body
2 Interchangeable lens unit
4 Quick return mirror
9 Viewfinder eyepiece window
10 Shutter unit
11 Imaging sensor (Imaging unit)
12 Body microcomputer
14 Shutter control unit
15 Image displaying control unit
16 Liquid crystal display monitor (Display unit)
18 Image recording unit
20 Lens microcomputer
21 Lens mount
23 Body mount
25 Focus lens group
27 Aperture control unit
28 Aperture unit
28b Aperture drive motor
29 Aperture adjustment unit
30 Release button
31 Shutter speed setting dial
33 Index
38 Zoom ring
39 Focus ring
40 Aperture ring (Aperture value setting unit)
41 Aperture linear sensor
43 Quick return mirror control unit
44 Quick return mirror drive motor
51 Analog signal processing unit 51
59 AGC unit (Image adjustment unit)
62 Zoom control unit
65 Focus drive motor
69 Interchangeable lens internal memory
71 Photographing/regenerating mode switching lever
72 MENU button 75 Photographing mode switching button
76 Depth of field reviewing mode button

BEST MODE FOR CARRYING OUT THE INVENTION

An embodiment of the present invention will be described below while referring to the figures.

First Embodiment

1: Overall Configuration of the Camera System

Figure 2:
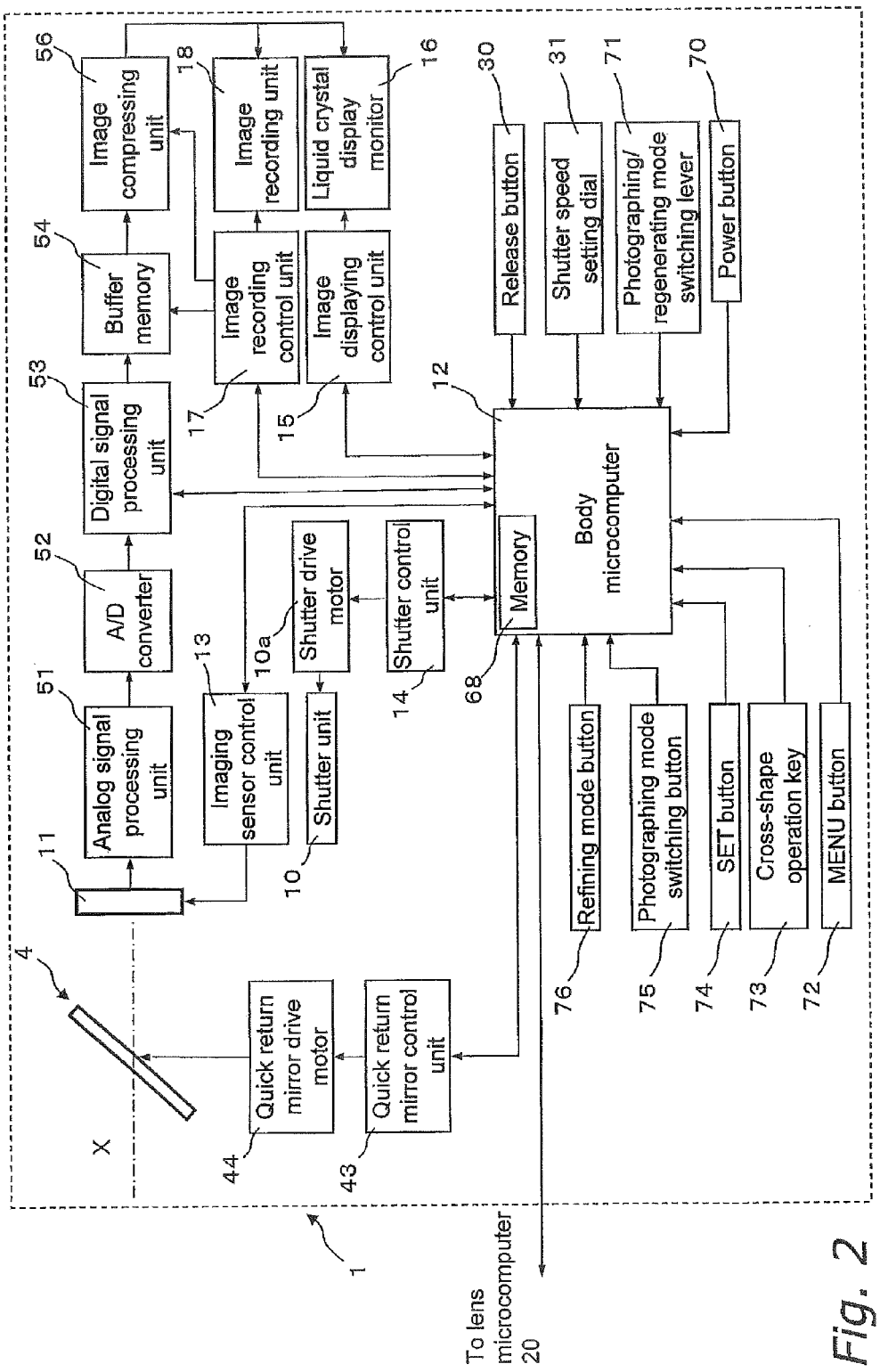
FIG. 2 is a block diagram showing the control system of a camera body.
Figure 3:
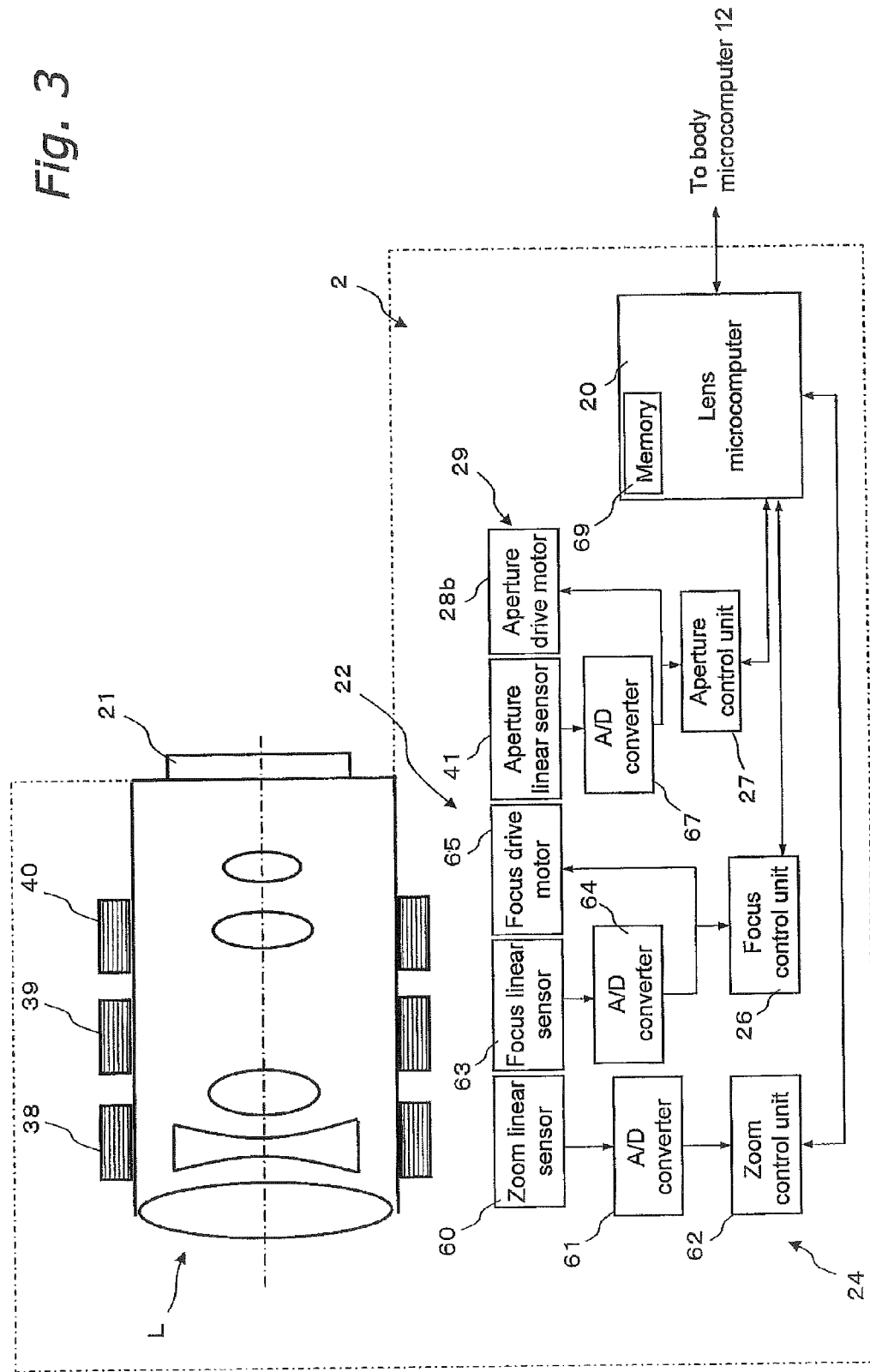
FIG. 3 is a block diagram showing the control system of an interchangeable lens.

A camera system 100 as one embodiment of the present invention will be described using FIGS. 1 to 3. FIG. 1 is an overall configuration diagram of the camera system 100. FIG. 2 is a control block diagram of a camera body 1. FIG. 3 is a control block diagram of an interchangeable lens unit 2.

The camera system 100 is a system used in a single-lens reflex digital camera of the interchangeable lens type. As shown in FIG. 1, the camera system 100 mainly includes a camera body 1, and an interchangeable lens unit 2 mounted on the camera body 1 and is removable. The interchangeable lens unit 2 forms an optical image of a subject. The camera body 1 converts the optical image formed by the interchangeable lens unit 2 into an electrical signal, and performs the recording of image data, displaying of an image, and the like.

1.1: Interchangeable Lens Unit

As shown in FIGS. 1 and 3, the interchangeable lens unit 2 mainly includes an imaging optical system L, a zoom adjustment unit 24 which adjusts the zoom magnifying power of the imaging optical system L, a focus adjustment unit 22 which adjusts the focus of the imaging optical system L, an aperture adjustment unit 29 which adjusts the aperture value (the actual F value which changes according to the opening degree of the aperture) of the imaging optical system L, and a lens microcomputer 20 as a lens control portion. The imaging optical system L connects a subject image to an imaging sensor 11 of the camera body 1.

The lens microcomputer 20 is a unit for controlling various sequences of the interchangeable lens unit 2. Various lens information regarding the interchangeable lens unit 2 are stored in the lens microcomputer 20. The lens microcomputer 20 can communicate both ways with a zoom control unit 62, a focus control unit 26, and an aperture control unit 27.

As shown in FIGS. 1 and 3, the zoom adjustment unit 24 mainly includes a zoom linear sensor 60, an A/D converter 61, and a zoom control unit 62. The zoom control unit 62 can receive signals from the zoom linear sensor 60 via the A/D converter 61. The zoom control unit 62 converts the rotational angle of a zoom ring 38 detected by the zoom linear sensor 60 into focal length information of the imaging optical system L. The zoom control unit 62 sends the focal length information to the lens microcomputer 20.

As shown in FIGS. 1 and 3, the focus adjustment unit 22 mainly includes a focus lens group 25, and a focus control unit 26 which controls the operation of the focus lens group 25. The focus control unit 26 can receive signals from the focus linear sensor 63, and can send the signals to a focus drive motor 65 via the A/D converter 64. The focus linear sensor 63 detects the rotational angle of a focus ring 39. The A/D converter 64 digitalizes the rotational angle information detected by the focus linear sensor 63. The focus control unit 26 converts the rotational angle information of the focus ring 39 digitalized by the A/D converter 64 into object point distance information. The focus control unit 26 sends the object point distance information to the lens microcomputer 20 based on a command from the lens microcomputer 20. The focus control unit 26 drives the focus drive motor 65 based on a control signal from the lens microcomputer 20. In this way, focus adjustment is performed by the focus adjustment unit 22.

The aperture adjustment unit 29 mainly includes an aperture unit 28, an aperture control unit 27 which controls the operation of the aperture unit 28, and an aperture ring 40 for setting an aperture value. The aperture unit 28 includes an aperture blade not shown in the figure, and an aperture drive motor 28b for driving the aperture blade.

The aperture control unit 27 detects the aperture value set by the aperture ring 40. More specifically, the aperture linear sensor 41 shown in FIG. 3 detects the rotational angle of the aperture ring 40. The A/D converter 67 digitalizes the rotational angle detected by the aperture ring 40. The aperture control unit 27 can receive signals from the aperture linear sensor 41 via the A/D converter 67, and converts the rotational angle information of the aperture ring 40 digitalized by the A/D converter 67 into aperture value information.

The aperture control unit 27 sends the aperture value information to the lens microcomputer 20 based on a command from the lens microcomputer 20, and drives the aperture drive motor 28b based on a control signal from the lens microcomputer 20. The aperture drive motor 28b drives the aperture blade according to the aperture value set at the aperture ring 40, according to the control signal from the aperture control unit 27. In this way, the aperture value of the imaging optical system L is adjusted by the aperture adjustment unit 29.

The interchangeable lens unit 2 further includes a lens mount 21, and is detachably mounted on a body mount 23 arranged in front of the camera body 1 via the lens mount 21. The interchangeable lens unit 2 includes an electrical segment, not shown in the figure, arranged on the lens mount 21. The camera body 1 includes an electrical segment, not shown in the figure, arranged on the body mount 23. The transmitting and receiving of lens information and various control signals are performed between the body microcomputer 12, which will be described later, and the lens microcomputer 20 via these electrical segments.

1.2: Camera Body

As shown in FIGS. 1 and 2, the camera body 1 mainly includes a quick return mirror 4, a viewfinder optical system 19, a focus detection unit 5, a shutter unit 10, an imaging unit 45, and a body microcomputer 12 as the body control unit. The body microcomputer 12 controls various sequences. For example, a phase difference detection system is adopted as the focus detection system of the focus detection unit 5.

As shown in FIGS. 1 and 2, a quick return mirror control unit 43 and a quick return mirror drive motor 44 are arranged for driving the quick return mirror 4. The quick return mirror control unit 43 drives the quick return mirror drive motor 44 based on a control signal from the body microcomputer 12. A shutter control unit 14 and a shutter drive motor 10a are arranged for driving the shutter unit 10. The shutter control unit 14 drives the shutter drive motor 10a (not shown in the figure) based on a control signal from the body microcomputer 12. The body microcomputer 12 can send signals to the shutter control unit 14 and the quick return mirror control unit 43.

The imaging unit 45 mainly includes an imaging sensor 11, and an imaging sensor control unit 13 which controls the operation of the imaging sensor 11. The imaging sensor 11 is, for example, a CCD (Charge Coupled Device), and the like. The imaging sensor 11 converts the optical image formed by the imaging optical system L of the interchangeable lens unit 2 into an image signal.

As shown in FIG. 2, the image signal outputted from the imaging sensor 11 is processed in order by an analog signal processing unit 51, an A/D converter 52, a digital signal processing unit 53, a buffer memory 54, and an image compressing unit 56. More specifically, the image signal is sent from the imaging sensor 11 to the analog signal processing unit 51. The analog signal processing unit 51 performs an analog signal processing such as gamma processing and the like on the image signal outputted from the imaging sensor 11.

An AGC (Auto Gain Control) unit 59 which corrects the level (Gain) of the analog image signal as the image adjustment unit is included in the analog signal processing unit 51. This AGC unit 59 has an amp function which compensates the level insufficiency of the image signal, in the case that proper exposure cannot be obtained in the depth of field reviewing mode which will be described later, and the like. In this amp function, the analog image signal is amplified by a proper amplification factor according to the set aperture value, so as to meet within the input voltage range of the A/D converter 52 which will be described later. For example, this analog signal processing unit 51 performs processing and the like which changes the gain on the actual aperture image captured in the depth of field reviewing mode which will be described later, using the AGC unit 59, so that the image displayed on the liquid crystal display monitor 16 which will be described later will have an optimum brightness. As a result, even in the case that the aperture value is large, the image shown on the liquid crystal display monitor 16 becomes bright, and it becomes easy to observe the actual aperture image.

The image signal with the analog signal processing performed thereon is sent to the A/D converter 52 from the analog signal processing unit 51. The A/D converter 52 converts the analog image signal outputted from the analog signal processing unit 51 into a digital signal.

The digital signal processing unit 53 performs a digital signal processing such as denoising, edge enhancement, and the like, on the image signal converted into a digital signal by the A/D converter 52. The image signal with the digital signal processing performed thereon is sent to the buffer memory 54 from the digital signal processing unit 53. The buffer memory 54 once stores the image signal processed by the digital signal processing unit 53. The buffer memory 54 is, for example, a RAM (Random Access Memory), and the like.

The image signal stored in the buffer memory 54 is sent to the image compressing unit 56 from the buffer memory 54 according to a command from an image recording control unit 17. The image compressing unit 56 performs a compressing processing on the image signal according to a command from the image recording control unit 17. Through this compressing processing, the data size of the image signal becomes smaller than the data size of the original image signal. The JPEG (Joint Photographic Experts Group) method and the like, for example, is used as the compressing method. The compressed image data is sent to an image recording unit 18 and the liquid crystal display monitor 16 from the image compressing unit 56.

The image recording control unit 17 and the image recording unit 18 are arranged in order to record the image signal. The image recording control unit 17 controls the image recording unit 18 to read and write the image data on, for example, a card type recording media, not shown in the figure. More specifically, the image recording control unit 17 controls the image recording unit 18 based on a control signal from the body microcomputer 12. The image recording unit 18 records the image data in an internal memory and/or a recording media, based on the command from the image recording control unit 17. The information stored with the image data is, for example, the time and date when the image is captured, the focal length information, shutter speed information, aperture value information, photographing mode information, and the like.

An image displaying portion 46 and the liquid crystal display monitor 16 are arranged in order to display the image of a subject. An image displaying control unit 15 controls the liquid crystal display monitor 16 based on a control signal from the body microcomputer 12. More specifically, the image displaying control unit 15 reads the image data obtained by the imaging sensor 11, and displays the image on the liquid crystal display monitor 16 after a predetermined process is performed on the image data. The liquid crystal display monitor 16 displays various information, and along with it, displays the image signal as a visible image, based on the command from the image displaying control unit 15. The information displayed includes, for example, focal length information, shutter speed information, aperture value information, photographing mode information, focused state information, whether or not there is an aperture ring 40 of the interchangeable lens unit 2, a setting step and the set width of the aperture value, and the like. In addition, the liquid crystal display monitor 16 displays a setting screen to be set by the user, in a predetermined photographing and regenerating mode, based on a command of the image displaying control unit 15.

The body microcomputer 12 can communicate both ways with the image recording control unit 17, the image displaying control unit 15, and the digital signal processing unit 53. The body microcomputer 12 includes a memory 68 which stores various information and signals.

1.3: Operation Portions

Figure 4:
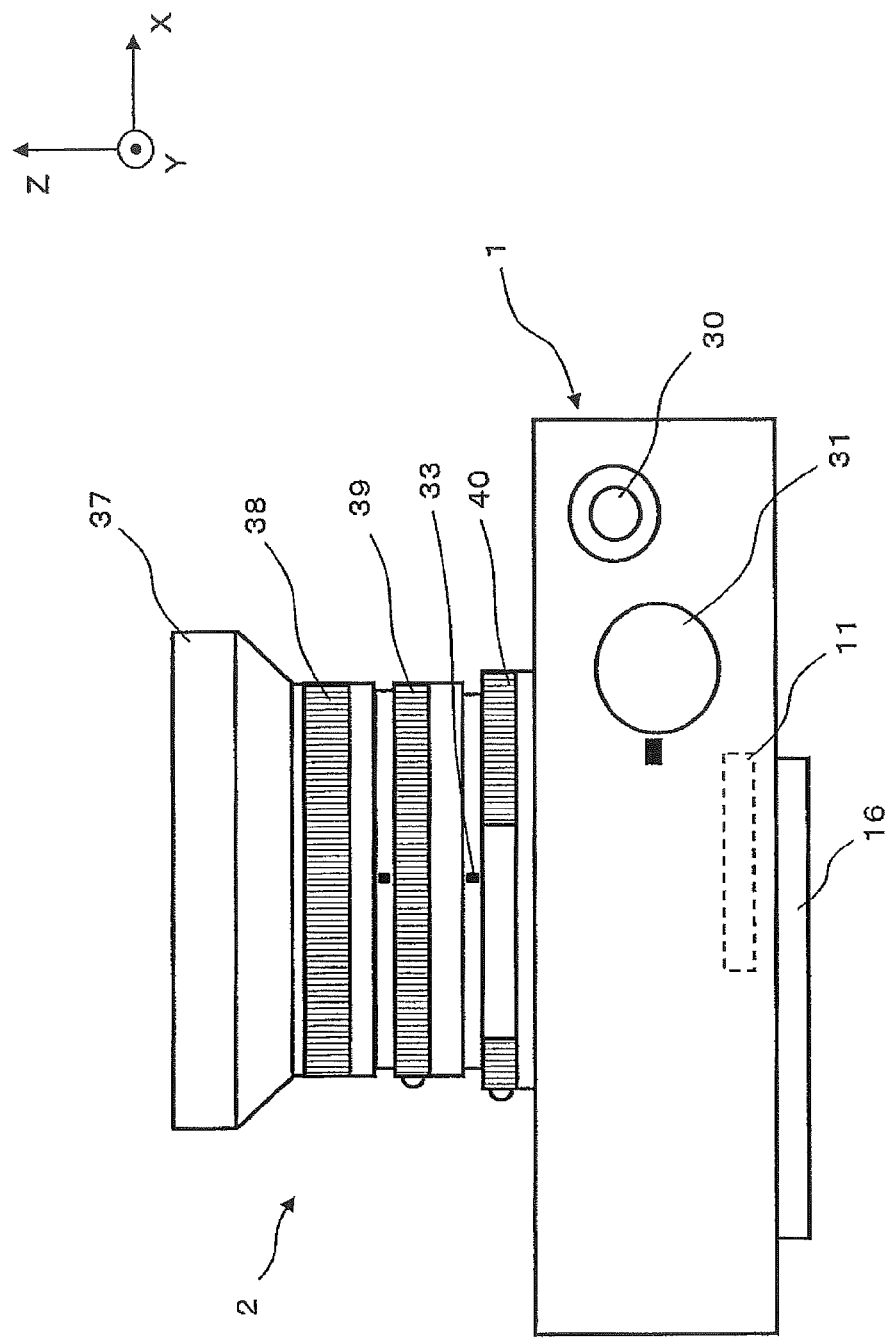
FIG. 4 is a top view of the camera system.
Figure 5:
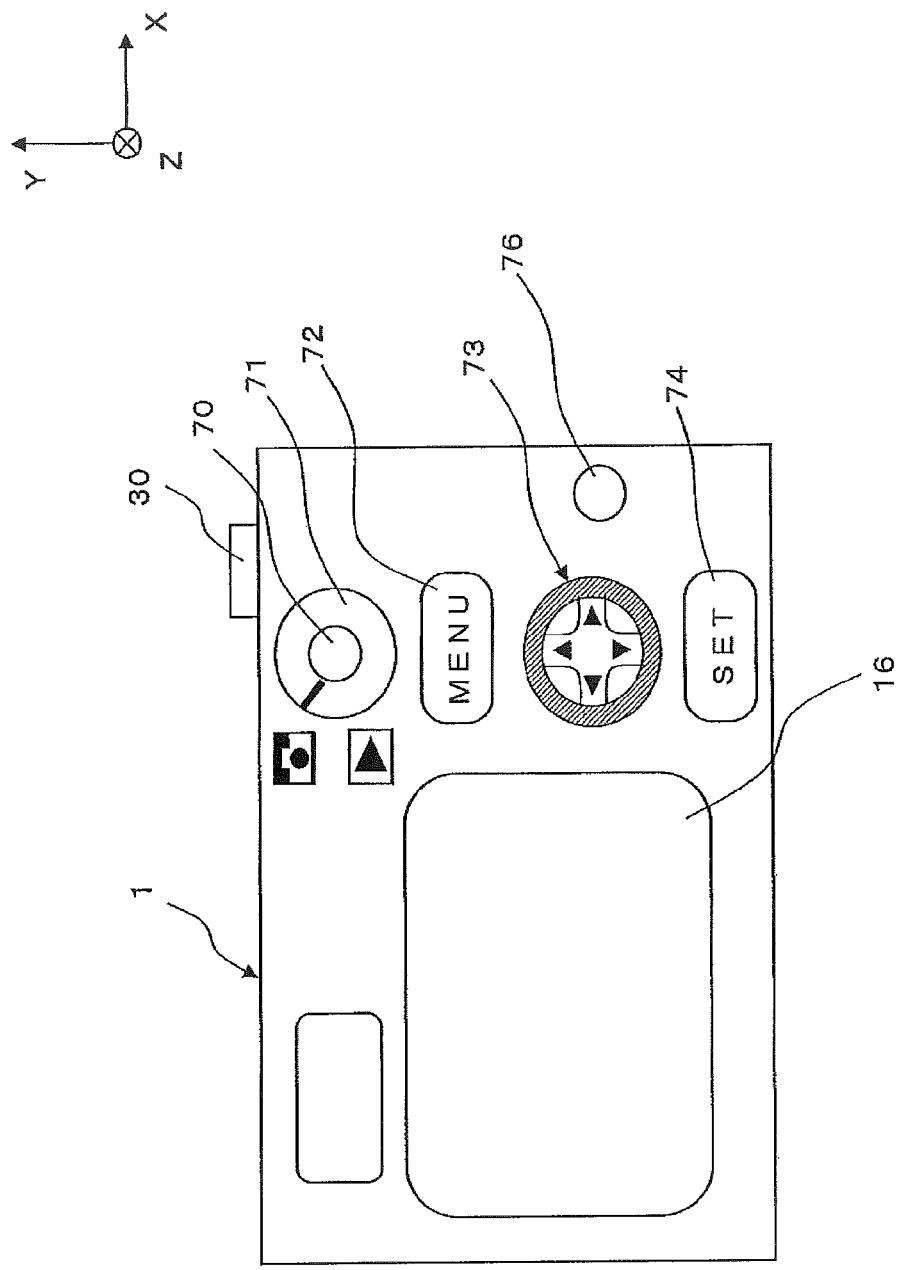
FIG. 5 is a rear side elevation of the camera system.

Here, the operation portions of the camera system 100 will be described using FIGS. 4 and 5. FIG. 4 is a top view of the camera system 100. FIG. 5 is a rear view of the camera body 1.

As shown in FIG. 4, a release button 30 and a shutter speed setting dial 31 are arranged on the camera body 1. The release button 30 and the shutter speed setting dial 31 are arranged on the top surface of the camera body 1.

The release button 30 sends the operation timing of the shutter to the body microcomputer 12. The shutter speed setting dial 31 is an operation member for setting the shutter speed. The shutter speed setting dial 31 sends the set shutter speed information and shutter mode information. It is possible to adjust the shutter speed by rotating the shutter speed setting dial 31. The shutter speed setting dial 31 has an automatic position in which the shutter speed is automatically set.

As shown in FIG. 4, a filter mount 37 is arranged on the subject side of the interchangeable lens unit 2. A zoom ring 38, a focus ring 39, and the aperture ring 40 are arranged in order toward the camera body 1 side (the Z axis direction negative side) from the filter mount 37, on the interchangeable lens unit 2. The zoom ring 38, the focus ring 39, and the aperture ring 40 are all cylindrical rotational operation members arranged rotatably on the outer circumferential surface of the interchangeable lens unit 2. The aperture ring 40 is an example of an aperture value setting portion.

As shown in FIG. 5, a power button 70, a photographing/regenerating mode switching lever 71, a MENU button 72, a cross-shape operation key 73, a SET button 74, and a depth of field reviewing mode button 76 are arranged on the rear surface of the camera body 1. The liquid crystal display monitor 16 is arranged on the rear surface (surface on the user side, surface on the Z axis direction negative side) of the camera body 1.

The power button 70 is a member which is operated to perform the ON/OFF of the power of the camera system 100. The photographing/regenerating mode switching lever 71 is a member which is operated to switch between a photographing mode and a regenerating mode. Here, the photographing mode is a mode in the camera system 100 for newly taking a picture of a subject and turning it into an image signal. The regenerating mode is a mode in the camera system 100 for displaying an image data which has already been photographed and stored.

When the user photographs, the power button 70 is switched to ON, and the photographing/regenerating mode switching lever 71 is switched to the photographing mode. By doing so, the power of the camera system 100 is turned on, and the visible image of a subject converted into an electrical image signal by the imaging sensor 11 is displayed on the liquid crystal display monitor 16 based on a command from the image displaying control unit 15.

The MENU button 72 is a member which is operated for displaying various operation menus on the liquid crystal display monitor 16. When the user presses the MENU button 72 in the state which the camera system 100 is in the photographing mode, a setting menu screen is displayed on the liquid crystal display monitor 16 based on the command of the image displaying control unit 15. On the setting menu screen, icons of setting items which can be changed by the user in the photographing mode are displayed.

The cross-shaped operation key 73 is a member which is operated for selecting a displayed item on the various operation menus, and it includes up and down, and left and right arrow keys. The SET button 74 is a member which is operated for deciding on a displayed item on the various operation menus. The depth of field reviewing mode button 76 is a button for changing into a depth of field reviewing mode which will be described later.

In addition, the body microcomputer 12 can receive signals from the release button 30, the shutter speed setting dial 31, the photographing/regenerating mode switching lever 71, the MENU button 72, the cross-shaped operation key 73, the SET button 74, a photographing mode switching button 75, and the depth of field reviewing mode button 76.

1.4: Aperture Ring

Figure 7:
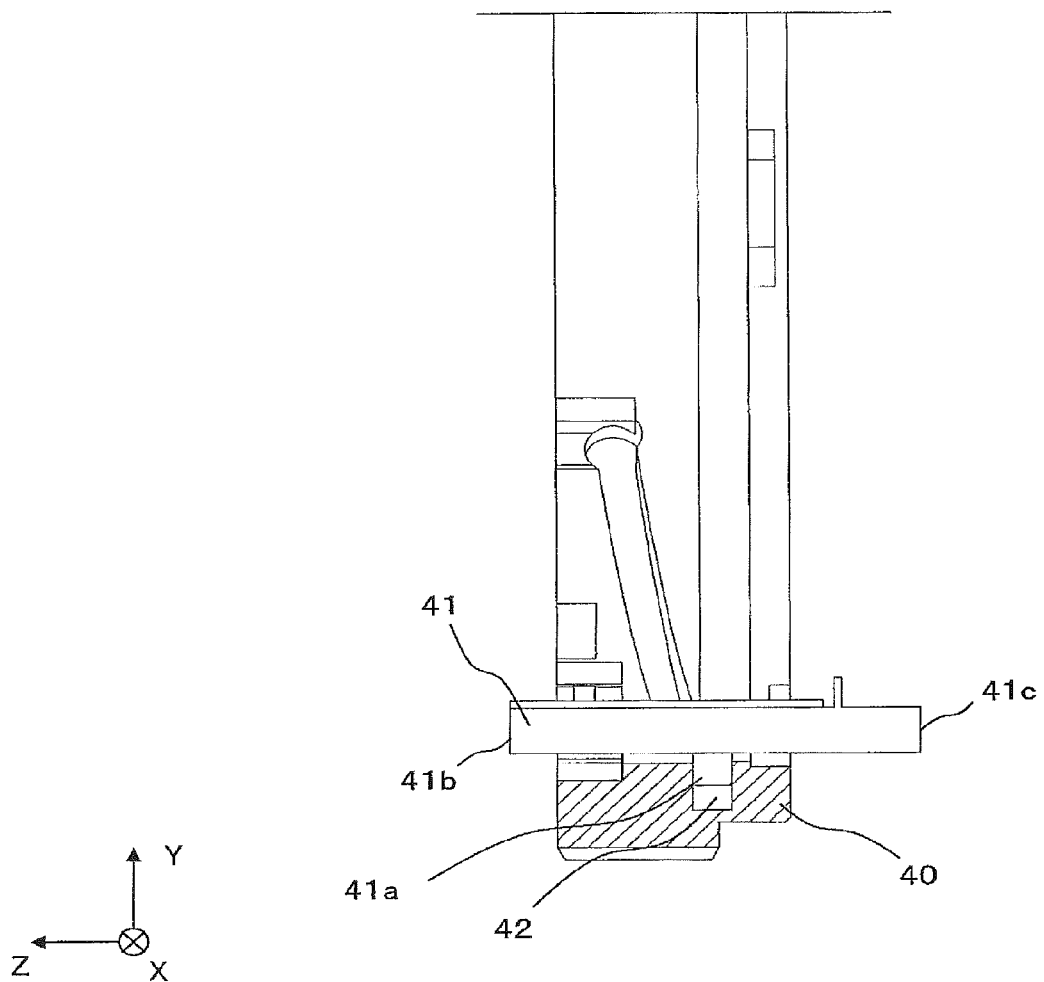
FIG. 7 is a section view showing the joining portion of the aperture ring and an aperture linear sensor.
Figure 8:
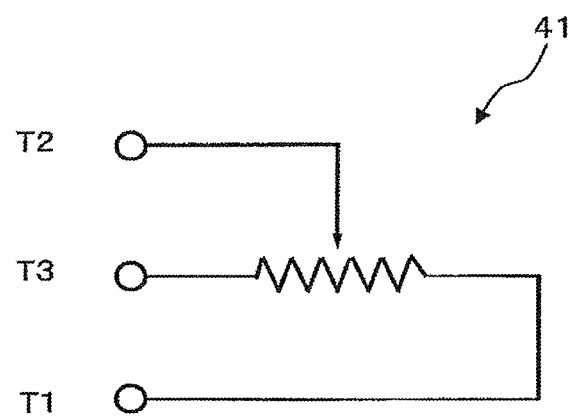
FIG. 8 is a circuit configuration diagram of the aperture linear sensor.
Figure 9:
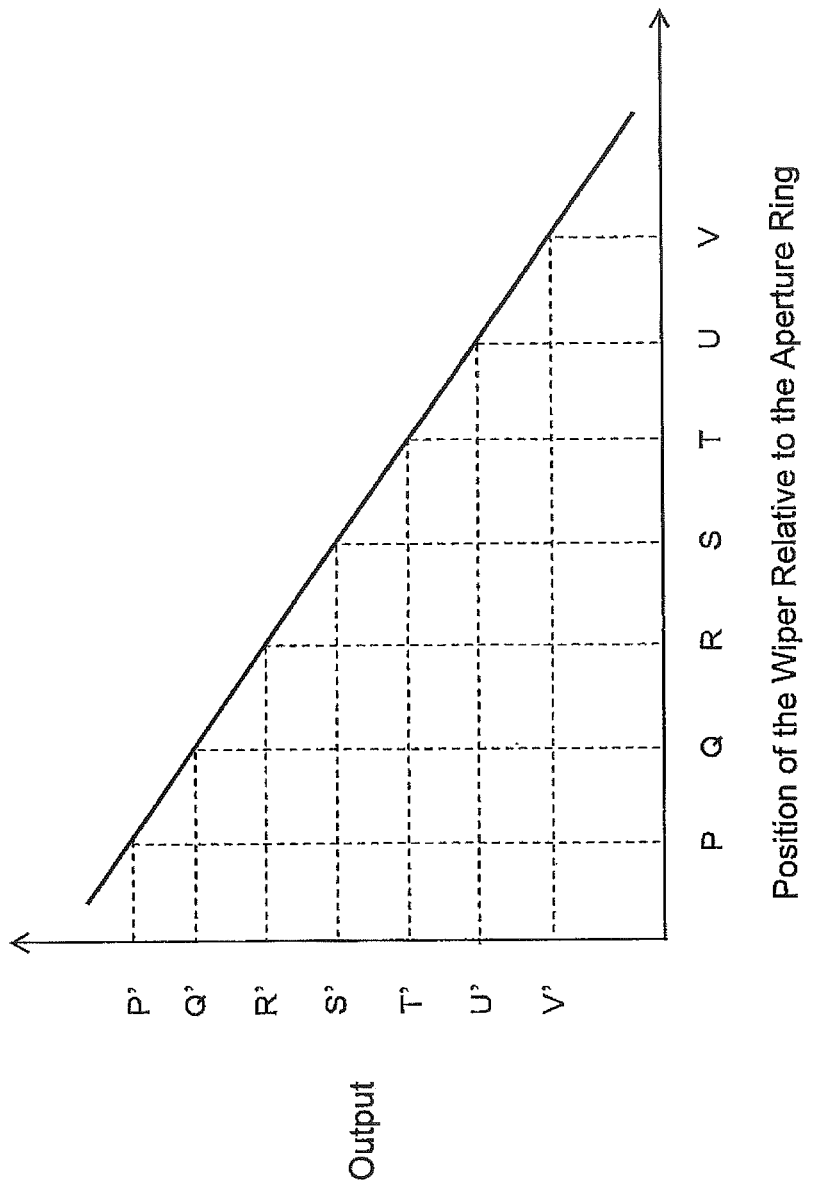
FIG. 9 is a graph showing the relationship between the position of a wiper relative to the aperture ring and the output value of the aperture linear sensor.

Here, the aperture ring 40 will be described using FIGS. 6A to 9. FIG. 6A is an expansion plan of the aperture ring 40 looked from the outside in the radial direction, and FIG. 6B is an expansion plan of the aperture ring looked from the inner side in the radial direction. FIG. 7 is a section view of the joining portion of the aperture ring 40 and an aperture linear sensor 41. FIG. 8 is a circuit configuration diagram of the aperture linear sensor 41. FIG. 9 is a graph which shows the relationship between the rotational angles of the aperture ring 40 and the output values of the aperture linear sensor 41.

As shown in FIG. 6A, aperture values are shown on the outer circumferential surface of the aperture ring 40. The display region of the aperture values is divided into two regions. More specifically, as shown in FIG. 6B, the displaying portion of every 1 AV (Aperture Value) from "2" to "11" corresponds to the manual mode. As shown in FIG. 6A, the displaying portion "A" corresponds to the automatic mode. As shown in FIG. 6B, on the inner circumferential portion of the aperture ring 40, a linear cam groove 42 is formed.

As shown in FIG. 7, the aperture linear sensor 41 has a cylindrical shaped wiper 41a which protrudes out in the radius direction of the aperture ring 40. As shown in FIGS. 6b and 7, the wiper 41a of the aperture linear sensor 41 is inserted into the cam groove 42 formed on the aperture ring 40. If the aperture ring 40 rotates, the wiper 41a moves in the direction (Z axis direction) along the optical axis along the cam groove 42.

As shown in FIG. 8, the aperture linear sensor 41 is made up of by a circuit which has a variable resistor. The terminal T2 shown in FIG. 8 is connected to the wiper 41a, and the terminals T2 and T3 are connected to two end portions 41b and 41c of the aperture linear sensor shown in FIG. 7. A predetermined voltage is applied between the terminals T1 and T3. By the sliding of the wiper 41a on a magnetoresistive element in the interior of the aperture linear sensor 41, the output (output voltage) of terminal T2 changes to be linear.

As shown in FIGS. 6A and 6B, if the position where the character "2" on the aperture ring 40 is shown matches the position of an index 33, the wiper 41a of the aperture linear sensor 41 is on the position P on the cam groove 42. In this case, as shown in FIG. 9, the output value (output voltage value) of the aperture linear sensor 41 becomes P'. In other words, the output voltage value of the aperture linear sensor 41, when the position of the character "2" on the aperture ring 40 shown is matched with the position of the index 33, becomes P'.

Likewise, when the positions where the characters "2.8", "4", "5.6", "8", "11", and "A" on the aperture ring 40 shown are matched with the position of the index 33, by rotating the aperture ring 40, the wiper 41a of the aperture linear sensor 41 is on positions Q, R, S, T, U, and V of the cam groove 42. In that case, the output value (output voltage value) of the aperture linear sensor 41 becomes Q', R', S', T', U', and V', respectively. In other words, the output voltage value of the aperture linear sensor 41 becomes Q', R', S', T', U', and V', when the positions where the characters "2.8", "4", "5.6", "8", "11", and "A" are shown on the aperture ring 40 are matched with the position of the index 33.

In this way, the aperture linear sensor 41 has an output (output voltage value) which corresponds one on one to the rotational angle of the aperture ring 40. An aperture value signal according to the rotational angle of the aperture ring 40 is outputted as the voltage change. Therefore, based on the output from the aperture linear sensor 41, it is possible to detect the rotational angle of the aperture ring 40.

2: Operation of the Camera System

Figure 10:
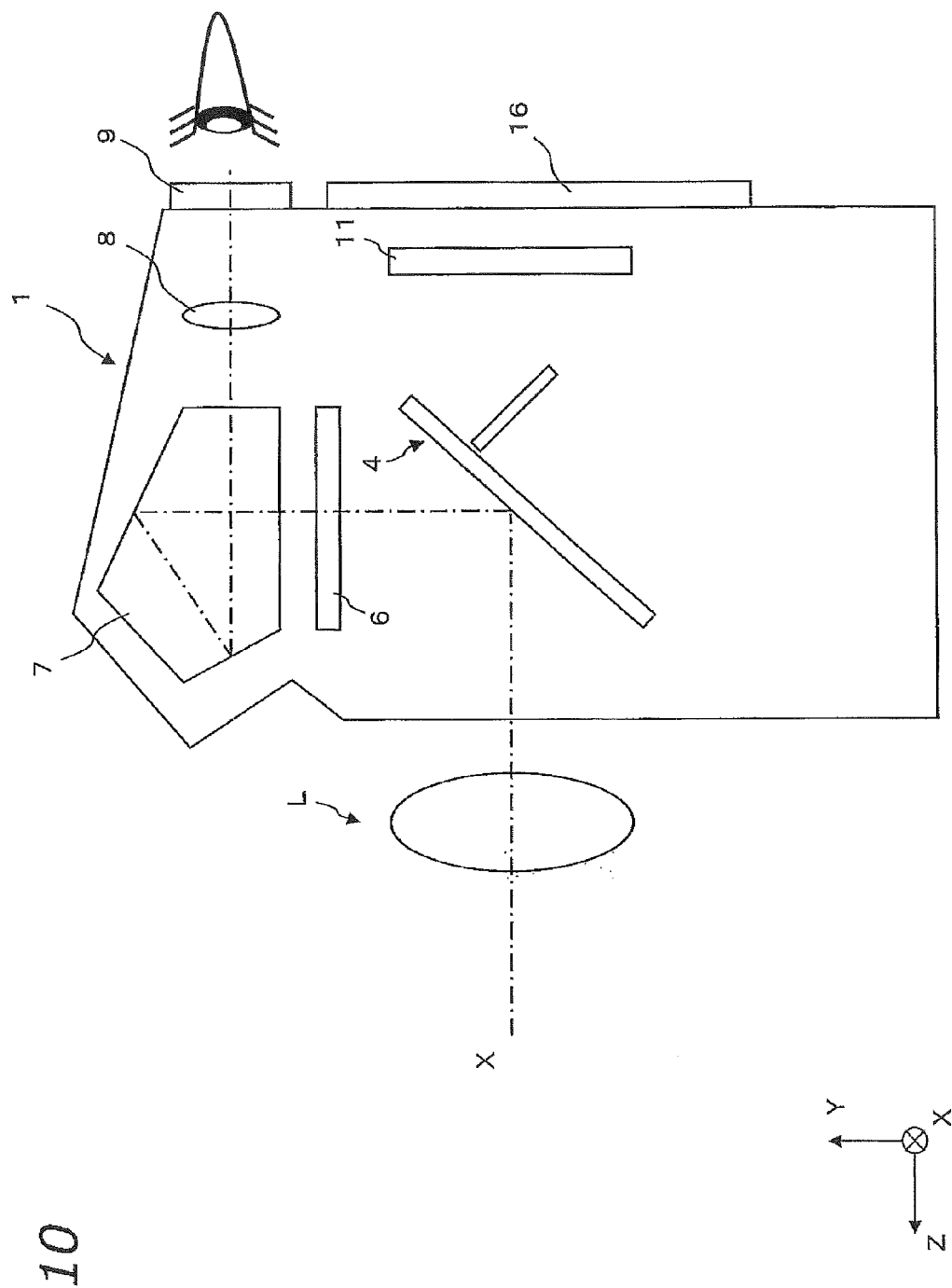
FIG. 10 is a diagram for describing a viewfinder photographing mode.
Figure 11:
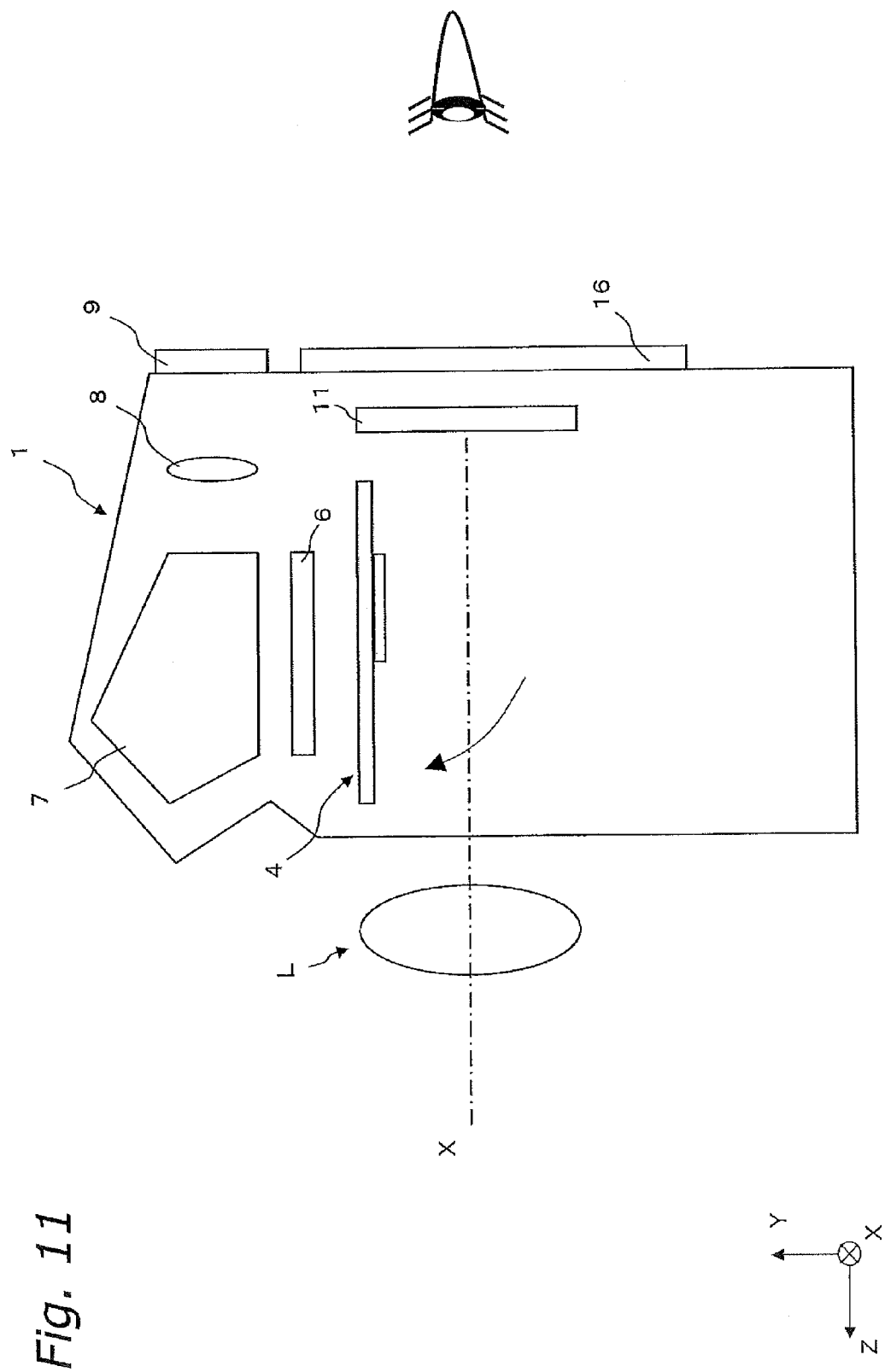
FIG. 11 is a diagram for describing a monitor photographing mode.

The operation of the camera system 100 will be described using FIGS. 10 and 11. FIG. 10 is a diagram for describing the viewfinder photographing mode. FIG. 11 is a diagram for describing the monitor photographing mode.

This camera system 100 has two photographing modes. One photographing mode is the viewfinder photographing mode in which a user photographs while observing the viewfinder eyepiece window 9, and it is the normal photographing mode in a conventional single-lens reflex camera. The other photographing mode is the monitor photographing mode in which the liquid crystal display monitor 16 is used to photograph.

2.1: Viewfinder Photographing Mode

As shown in FIG. 10, in the viewfinder photographing mode, the quick return mirror 4 is arranged on a predetermined position on the optical path X. Therefore, the light from a subject which passed the interchangeable lens unit 2 is divided into two light beams by a main mirror 4a of the quick return mirror 4. The reflected light beam is led to the viewfinder optical system 19. The transmitted light beam is reflected by a sub mirror 4b arranged on the rear side of the quick return mirror 4, and is used as an AF (Automatic Focus) light beam of the focus detection unit 5.

The light beam reflected by the main mirror 4a forms an image on a viewfinder screen 6. The subject image formed on the viewfinder screen 6 can be observed from a viewfinder eyepiece window 9 via a pentaprism 7 and an eyepiece 8. In this way, in this viewfinder photographing mode, a user can observe a subject image from the viewfinder eyepiece window 9.

When actually photographing, the quick return mirror 4 is flipped to be outside the optical path X and the shutter unit 10 is opened, and the subject image is formed on the imaging surface of the imaging sensor 11. As a result, it is possible to obtain a subject image.

Power is supplied to the body microcomputer 12 of the camera body 1, the lens microcomputer 20 of the interchangeable lens unit 2, and various units, with the operation of a user pressing the release button 30 half way down. The body microcomputer 12, the lens microcomputer 20, and various units are actuated by the power supply. The body microcomputer 12 receives various lens information from the lens microcomputer 20, via the lens mount 21 and the body mount 23. The lens information is stored in a built-in memory 68 in the body microcomputer 12.

Next, a defocus amount (hereinafter referred to as Df amount) is obtained by the focus detection unit 5, and the Df amount is sent to the body microcomputer 12. The focus lens group 25 is driven according to the Df amount. More specifically, a drive command of the focus lens group 25 is sent to the lens microcomputer 20 from the body microcomputer 12. The focus lens group 25 is driven by only the Df amount by the lens microcomputer 20 via the focus control unit 26. The Df amount becomes smaller if the focus detection and the drive of the focus lens group 25 are repeated. When the Df amount became equal to or below a predetermined amount, the body microcomputer 12 determines that it is focused, and stops the drive of the focus lens group 25.

After that, if the release button 30 is pressed all the way down, an aperture adjustment command is sent from the body microcomputer 12 to the lens microcomputer 20. At this time, for example, based on the output from a photometric sensor which is not shown in the figure, the aperture value is calculated by the body microcomputer 12. The opening degree of the aperture of the aperture unit 28 is adjusted by the lens microcomputer 20 via the aperture control unit 27.

Simultaneously with the aperture adjustment, a command for retracting the quick return mirror 4 from the optical path X is sent from the body microcomputer 12 to the quick return mirror control unit 43. After retraction is completed, the imaging sensor 11 is driven by the imaging sensor control unit 13, and the shutter unit 10 is driven by the shutter control unit 14. The opened state of the shutter unit 10 is kept and the imaging sensor 11 is exposed by only the time of the shutter speed calculated based on the output from the photometric sensor not shown in the figure by the shutter control unit 14.

After exposure is completed, a predetermined image processing is performed on the image signal outputted from the imaging sensor 11, and the image photographed is displayed on the liquid crystal display monitor 16. In addition, the image data is recorded in a memory media via the image recording unit 18. After exposure is completed, the quick return mirror 4 and the shutter unit 10 are reset to the initial positions. A command to reset the aperture unit 28 to the opened position is sent from the body microcomputer 12 to the lens microcomputer 20. A reset command reaches each unit from the lens microcomputer 20. After reset is completed, reset completion information is sent to the body microcomputer 12 from the lens microcomputer 20. If the reset completion information from the lens microcomputer 20 is received and a series of processes after exposure is completed, the body microcomputer 12 confirms that the release button 30 is not being pressed, and the photographing sequence ends.

2.2: Monitor Photographing Mode

As shown in FIG. 11, when photographing in the monitor photographing mode, a photographing mode switching button 75 is operated, and the photographing mode changes to the monitor photographing mode. More specifically, the quick return mirror drive motor 44 drives the quick return mirror 4 by the quick return mirror control unit 43, and the quick return mirror 4 retracts outside the optical path X. As a result, the subject image formed by the imaging optical system L incident on the imaging sensor 11. An image signal is outputted from the imaging sensor 11, and after a predetermined image processing is performed, the image photographed is displayed on the liquid crystal display monitor 16. In this way, in the monitor photographing mode, by displaying a real-time image of the subject on the liquid crystal display monitor 16, a user can observe a subject without peering through the viewfinder eyepiece window 9.

If a user presses the release button 30 half way down, same as the viewfinder photographing mode, the focus adjustment and the aperture adjustment are preformed. In the case of the monitor photographing mode, when detecting the focus, the quick return mirror drive motor 44 is driven by the quick return mirror control unit 43, and the quick return mirror 4 is returned to a predetermined position on the optical path X. The Df amount is obtained by the focus detection unit 5, and the focus lens group 25 is driven according to the Df amount. The Df amount becomes smaller if the focus detection and the drive of the focus lens group 25 are repeated. When the Df amount became equal to or below a predetermined amount, the body microcomputer 12 determines that it is focused, and makes the focus control unit 26 stop the drive of the focus lens group 25.

The photographing operation when the release button 30 is pressed all the way down is the same as the case with the viewfinder photographing mode described previously. After exposure is completed, the quick return mirror 4 is kept in a state of being retracted from the optical path X. By doing so, it is possible to continue with the monitor photographing mode.

If the photographing mode switching button 75 is operated, the monitor photographing mode is terminated, and it is switched to the viewfinder photographing mode. In this case, the quick return mirror 4 is returned to a predetermined position on the optical path X. In addition, even in the case that the power of the camera system 100 is switched to OFF, the quick return mirror 4 is returned to the predetermined position on the optical path X.

In this way, in this camera system 100, since it is possible to use the monitor photographing mode, it becomes extremely easy for a beginner who is inexperienced with the photographing of a digital camera to use the camera.

2.3: Selection of the Exposure Setting Mode

The camera system 100 includes a program photographing mode, a shutter speed priority photographing mode, an aperture priority mode, and a manual photographing mode, as the exposure setting modes. The program photographing mode is a mode which performs exposure setting automatically with respect to a normal photographing region. The shutter speed priority mode is a mode in which the shutter speed is set manually. The aperture priority mode is a mode in which the aperture value is set manually. The manual photographing mode is a mode in which both the shutter speed and the aperture value are set manually.

These four exposure setting modes can be selected through the aperture ring 40 and the shutter speed setting dial 31. More specifically, for example, the program photographing mode is selected, if the shutter speed is set to automatic through the shutter speed setting dial 31, in the state in which the character "A" on the aperture ring 40 matches the index 33. The shutter speed priority photographing mode is selected, if the shutter speed is set to manual through the shutter speed setting dial 31, in the state in which the character "A" on the aperture ring 40 matches the index 33. The aperture priority photographing mode is selected, if the shutter speed is set to automatic through the shutter speed setting dial 31, in the state in which one of any of the characters "2" to "11" on the aperture ring 40 matches the index 33. The manual photographing mode is selected, if the shutter speed is set to manual through the shutter speed setting dial 31, in the state in which one of any of the characters "2" to "11" on the aperture ring 40 matches the index 33.

Below, out of the four exposure setting modes, the program photographing mode and the shutter speed priority photographing mode are collectively called the automatic aperture mode. Out of the four exposure setting modes, the aperture priority photographing mode and the manual photographing mode are collectively called the manual aperture mode.

2.4: Automatic Aperture Mode

The aperture linear sensor 41 outputs a signal according to the rotational angle of the aperture ring 40 to the aperture control unit 27. The aperture control unit 27 determines that the exposure setting mode is the automatic aperture mode based on the signal received from the aperture linear sensor 41, if the release button 30 is being operated, and if the character "A" on the aperture ring 40 matches the index 33. The result determined at the aperture control unit 27 is sent to the lens microcomputer 20 and the body microcomputer 12. At this time, the transmission to the body microcomputer 12 is, for example, performed via inter-microcomputer communication between the lens microcomputer 20 and the body microcomputer 12.

The shutter speed setting dial 31 outputs a signal according to the rotational angle to the body microcomputer 12. The body microcomputer 12 determines that the exposure setting mode is the automatic aperture mode based on the determined result received from the aperture control unit 27 and the signal from the shutter speed setting dial 31.

A command is sent from the body microcomputer 12 to the digital signal processing unit 53, and an image signal is sent to the body microcomputer 12 at a predetermined timing from the digital signal processing unit 53. An exposure value is calculated by the body microcomputer 12 based on the image signal sent from the digital signal processing unit 53. If the exposure setting mode is the program photographing mode, an appropriate combination of an aperture value and a shutter speed from the adjustable aperture values and the shutter speeds is decided by the body microcomputer 12. If the exposure setting mode is the shutter speed priority photographing mode, an appropriate aperture value for the set shutter speed is calculated by the body microcomputer 12.

A control signal is generated by the body microcomputer 12 based on the calculated result. This control signal is sent to the aperture control unit 27 from the body microcomputer 12 via the lens microcomputer 20. If the exposure setting mode is the program photographing mode, the control signal based on the shutter speed which is calculated is sent to the shutter control unit 14 from the body microcomputer 12. If the exposure setting mode is the shutter speed priority photographing mode, the shutter speed set through the shutter speed setting dial 31 is sent to the shutter control unit 14 from the body microcomputer 12.

Simultaneously with this, a control signal is sent to the image displaying control unit 15 from the body microcomputer 12. The image displaying control unit 15 drives the liquid crystal display monitor 16 based on this control signal. More specifically, if the exposure setting mode is the program photographing mode, the information that the exposure setting mode is the program photographing mode is displayed on the liquid crystal display monitor 16 by the image displaying control unit 15. If the exposure setting mode is the shutter speed priority mode, the information that the exposure setting mode is the shutter speed priority mode is displayed on the liquid crystal display monitor 16 by the image displaying control unit 15.

A drive signal for driving the aperture drive motor 28b is generated by the aperture control unit 27, based on a control signal from the lens microcomputer 20. The aperture drive motor 28b is driven based on this drive signal, and the aperture blade of the aperture unit 28 is driven by the aperture drive motor 28b.

A drive signal for driving the shutter drive motor 10a is generated by the shutter control unit 14 based on a control signal from the body microcomputer 12. The shutter drive motor 10a is driven based on this drive signal, and the shutter unit 10 is driven by the shutter drive motor 10a.

The exposure setting according to the automatic aperture mode in the camera system 100 is performed as described above. The operations above are executed instantaneously, after the release button 30 is operated.

When photographing ends, a control signal is sent to the image recording control unit 17 from the body microcomputer 12. As a result, an image signal is recorded in an internal memory and/or a recording media by the image recording unit 18, based on a command from the image recording control unit 17.

If the exposure setting mode is the program setting mode, the information that the exposure setting mode is the program photographing mode is recorded in the internal memory and/or a recording media with the image signal, based on a command from the image recording control unit 17. If the exposure setting mode is the shutter priority mode, the information that the exposure setting mode is the shutter speed priority mode is recorded in the internal memory and/or the recording media with the image signal, based on a command from the image recording control unit 17.

2.5: Manual Aperture Mode

If a character of any of the characters "2" to "11" on the aperture ring 40 matches the index 33, and if the release button 30 is operated, the aperture control unit 27 determines that the exposure setting mode is the manual aperture mode, based on the signal received from the aperture linear sensor 41. The determined result at the aperture control unit 27 is sent to the lens microcomputer 20.

The shutter speed setting dial 31 outputs a signal according to the rotational angle to the body microcomputer 12. The exposure setting mode being the manual aperture mode is determined by the body microcomputer 12 based on the determined result received from the aperture control unit 27 and the signal from the shutter speed setting dial 31.

The lens microcomputer 20 requests the aperture control unit 27 for the aperture value information detected from the rotational angle of the aperture ring 40. The aperture value information detected from the rotational angle of the aperture ring 40 is sent to the lens microcomputer 20 and the body microcomputer 12 from the aperture control unit 27, based on the command from the lens microcomputer 20. If the exposure setting mode is the aperture priority photographing mode, a command is sent to the digital signal processing unit 53 from the body microcomputer 12, and an image signal is sent to the body microcomputer 12 from the digital signal processing unit 53 at a predetermined timing If the exposure setting mode is the aperture priority photographing mode, the shutter speed is calculated by the body microcomputer 12 based on the image signal. If the exposure setting mode is the aperture priority photographing mode, an appropriate shutter speed is calculated by the body microcomputer 12 for the detected aperture value. If the exposure setting mode is the aperture priority photographing mode, a control signal is generated by the body microcomputer 12 based on the calculated result. If the exposure setting mode is the aperture priority photographing mode, the control signal based on the calculated shutter speed is sent to the shutter control unit 14 by the body microcomputer 12. If the exposure setting mode is the manual photographing mode, the shutter speed set through the shutter speed setting dial 31 is sent to the shutter control unit 14 by the body microcomputer 12.

Simultaneously with this, a control signal is sent to the image displaying control unit 15 from the body microcomputer 12. The image displaying control unit 15 drives the liquid crystal display monitor 16 based on this control signal. More specifically, if the exposure setting mode is the aperture priority photographing mode, the information that the exposure setting mode is the aperture priority photographing mode is displayed on the liquid crystal display monitor 16 by the image displaying control unit 15. If the exposure setting mode is the manual photographing mode, the information that the exposure setting mode is the manual photographing mode is displayed on the liquid crystal display monitor 16 by the image displaying control unit 15.

A drive signal for driving the aperture drive motor 28b is generated by the aperture control unit 27, based on a control signal from the lens microcomputer 20. Based on this drive signal, the aperture drive motor 28b is driven, and the aperture blade of the aperture unit 28 is driven by the aperture drive motor 28b.

A drive signal for driving the shutter drive motor 10a is generated by the shutter control unit 14, based on a control signal from the body microcomputer 12. The shutter drive motor 10a is driven based on this drive signal, and the shutter unit 10 is driven by the shutter drive motor 10a.

The exposure setting according to the manual aperture mode in the camera system 100 is performed as described above. The operations above are executed instantaneously, after the release button 30 is operated.

When photographing ends, a control signal is sent to the image recording control unit 17 from the body microcomputer 12. As a result, an image signal is recorded in an internal memory and/or a recording media by the image recording unit 18, based on a command of the image recording control unit 17.

If the exposure setting mode is the aperture priority mode, the information that the exposure setting mode is the aperture priority mode is recorded in the internal memory and/or the recording media with the image signal by the image recording unit 18, based on a command from the image recording control unit 17. If the exposure setting mode is the manual photographing mode, the information that the exposure setting mode is the manual photographing mode is recorded in the internal memory and/or the recording media by the image recording unit 18 with the image signal, based on a command from the image recording control unit 17.

3: Depth of Field Reviewing Mode

Next, a depth of field reviewing mode when photographing will be described.

3.1: Summary of the Depth of Field Reviewing Mode

In the depth of field reviewing mode, the depth of field is checked via the liquid crystal display monitor 16. More specifically, for example, with the viewfinder photographing mode, if the depth of field reviewing mode button 76 is pressed, the photographing mode automatically changes to the monitor photographing mode. As a result, a real-time image corresponding to the actual aperture value at the aperture unit 28 is displayed on the liquid crystal display monitor 16. This allows the depth of field to be easily checked via the liquid crystal display monitor 16.

For example, in this depth of field reviewing mode, if the aperture ring 40 is equipped in the interchangeable lens unit 2, the lens microcomputer 20 requests the aperture control unit 27 for the aperture value information detected based on the rotational angle of the aperture ring 40. The aperture value information detected from the rotational angle of the aperture ring 40 is sent to the lens microcomputer 20 and the body microcomputer 12 by the aperture control unit 27, based on a command from the lens microcomputer 20. A drive signal for driving the aperture drive motor 28b is generated by the aperture control unit 27, based on a control signal from the lens microcomputer 20. The aperture drive motor 28b is driven based on this drive signal, and the aperture blade of the aperture unit 28 is driven by the aperture drive motor 28b.

3.2: Specific Operations of the Depth of Field Reviewing Mode

Figure 12:
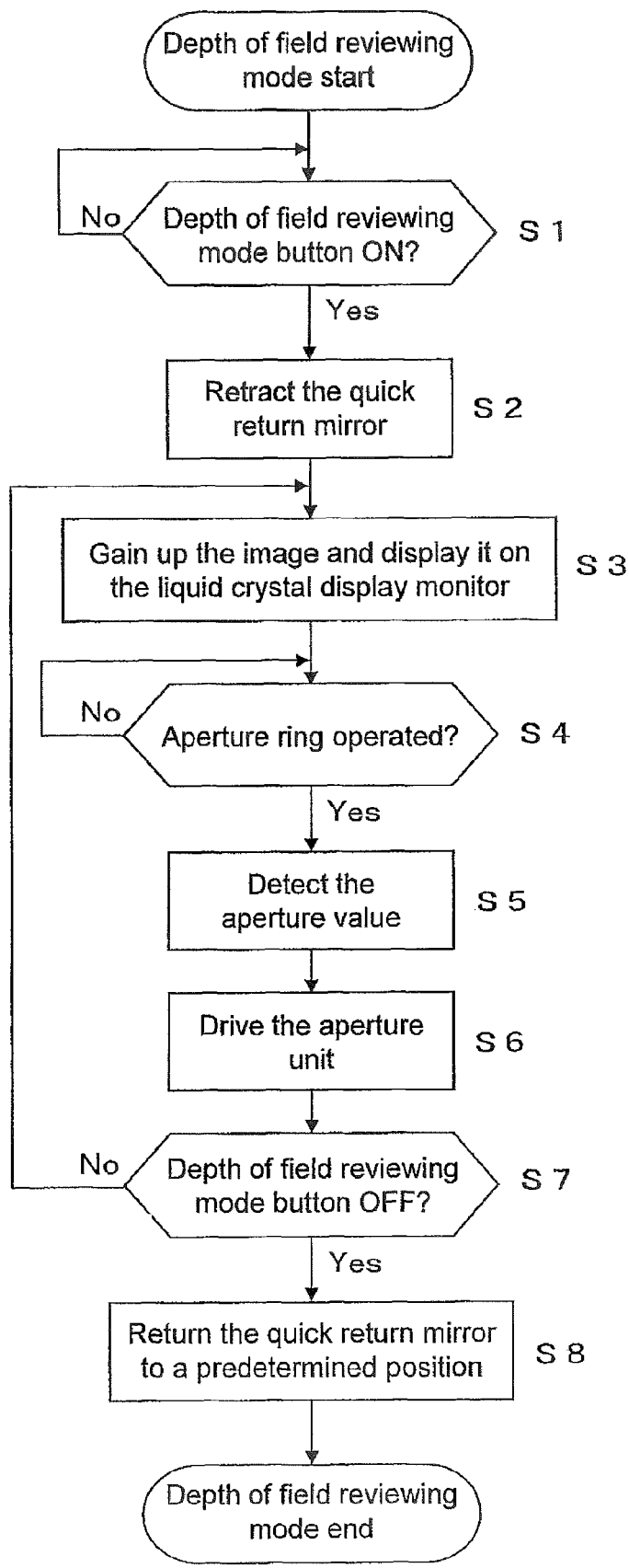
FIG. 12 is a flowchart of a depth of field reviewing mode.
Figure 13A:
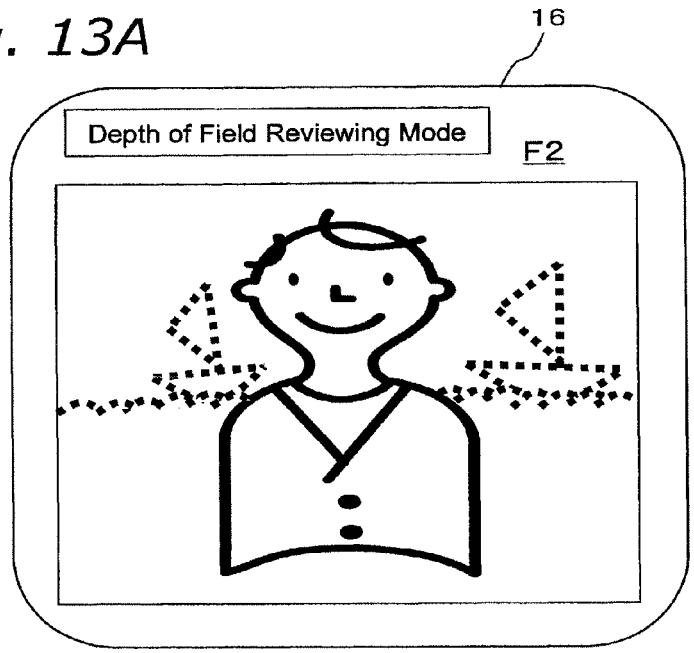
FIG. 13A and FIG. 13B are examples of images displayed on a liquid crystal display monitor.
Figure 13B:
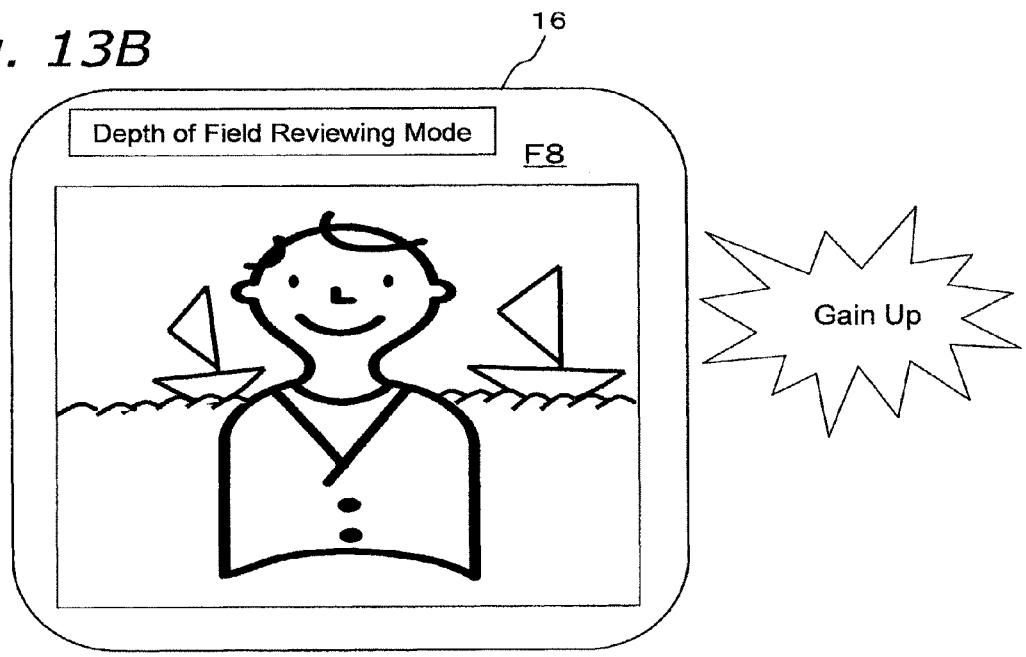

Next, Specific operations in the depth of field reviewing mode will be described using FIGS. 12 and 13. FIG. 12 is a flowchart of the depth of field reviewing mode. FIG. 13A is an example of an actual aperture image when the aperture value is F2. FIG. 13B is an example of an actual aperture image when the aperture value is F8.

As shown in FIG. 12, whether or not the depth of field reviewing mode button 76 is pressed is determined by the body microcomputer 12 (S1). If the depth of field reviewing mode button 76 is pressed, it changes to the depth of field reviewing mode (S2). As shown in FIG. 11, in the depth of field reviewing mode, the quick return mirror drive motor 44 is driven by the quick return mirror control unit 43, and the quick return mirror 4 retracts to be outside the optical path X. After the retraction of the quick return mirror 4, the operation of the imaging sensor 11 starts.

Next, as shown in FIGS. 13A and 13B, a real-time image obtained by the imaging sensor 11 is displayed on the liquid crystal display monitor 16, based on a command from the image displaying control unit 15 (S3). If a user operates the aperture ring 40, the aperture information is detected based on the rotational angle of the aperture ring 40 by the aperture control unit 27, based on a command from the lens microcomputer 20 (S4, S5). A drive signal for driving the aperture drive motor 28b is generated by the aperture control unit 27 based on a control signal from the lens microcomputer 20, and the aperture blade of the aperture unit 28 is driven by the aperture drive motor 28b (S6). As a result, the aperture value of the imaging optical system L is changed to the aperture value set by the aperture ring 40. For example, if the aperture value set by the aperture ring 40 is F8, as shown in FIGS. 13A and 13B for example, a real-time image with an aperture value being F8 is displayed on the liquid crystal display monitor 16. At this time, for example, the aperture value F8 is displayed on the upper right hand side of the image on the liquid crystal display monitor 16.

Here, the actual aperture image displayed on the liquid crystal display monitor 16 will be described. With an actual aperture image, the depth of field and the brightness change according to the aperture value. For example, as shown in FIG. 13A, if the aperture value is F2, an image in which the depth of field is shallow with a background that is out of focus compared to the image of the figure captured in the middle is displayed. On the other hand, if the aperture value is F8, as shown in FIG. 13B, an image in which the depth of field is comparatively deep with the figure in the middle and the background focused compared to the case in which the aperture value is F2 is displayed.

However, normally, with an image in which the aperture value is F8, the amount of light incident on the imaging sensor 11 within a fixed time is little, compared to the case in which the aperture value is F2. Therefore, compared to an image in which the aperture value is F2, with an image in which the aperture value is F8, the image displayed on the liquid crystal display monitor 16 becomes dark, and it is difficult for the user to see it.

Consequently, in this camera system 100, a gain alteration treatment (gain up) on the actual aperture image is performed by the AGC unit 59 of the analog signal processing unit 51 described previously, so that it is displayed with an optimum brightness on the liquid crystal display monitor 16. More specifically, the analog signal of the actual aperture image is amplified by the AGC unit 59 according to the aperture value. As a result, it is possible for the brightness of the two images shown in FIGS. 13(a) and (b) to be approximately the same, regardless of the aperture values.

In this way, in this camera system 100, it is possible to brightly display an actual aperture image that becomes dark, according to the aperture value. By doing so, without being affected by the difference in the brightness, the user can easily check the depth of field of an image.

Whether the depth of field reviewing mode button 76 is OFF or not is determined by the body microcomputer 12, and Steps S3 to S6 are repeated, if it is not OFF (S7). As a result, a real-time image corresponding to the aperture value set on the aperture ring 40 is displayed on the liquid crystal display monitor 16, and it is possible to easily check the depth of field when photographing via the liquid crystal display monitor 16.

On the other hand, if the depth of field reviewing mode button 76 is switched to OFF, the quick return mirror 4 is returned to a predetermined position on the optical path X, and the depth of field reviewing mode ends (S8).

4: Advantages

In this camera system 100, the analog signal of an actual aperture image is amplified according to the set aperture value by the AGC unit 59 of the analog signal processing unit 51. Therefore, even if the aperture value is small and that the amount of light incident on the imaging sensor 11 within a fixed time is little, the actual aperture image displayed on the liquid crystal display monitor 16 is bright, regardless of the aperture value. As a result, the user can easily check the depth of field of images without being affected by the difference in the brightness of the images due to the difference in the aperture values.

Second Embodiment

Figure 14:
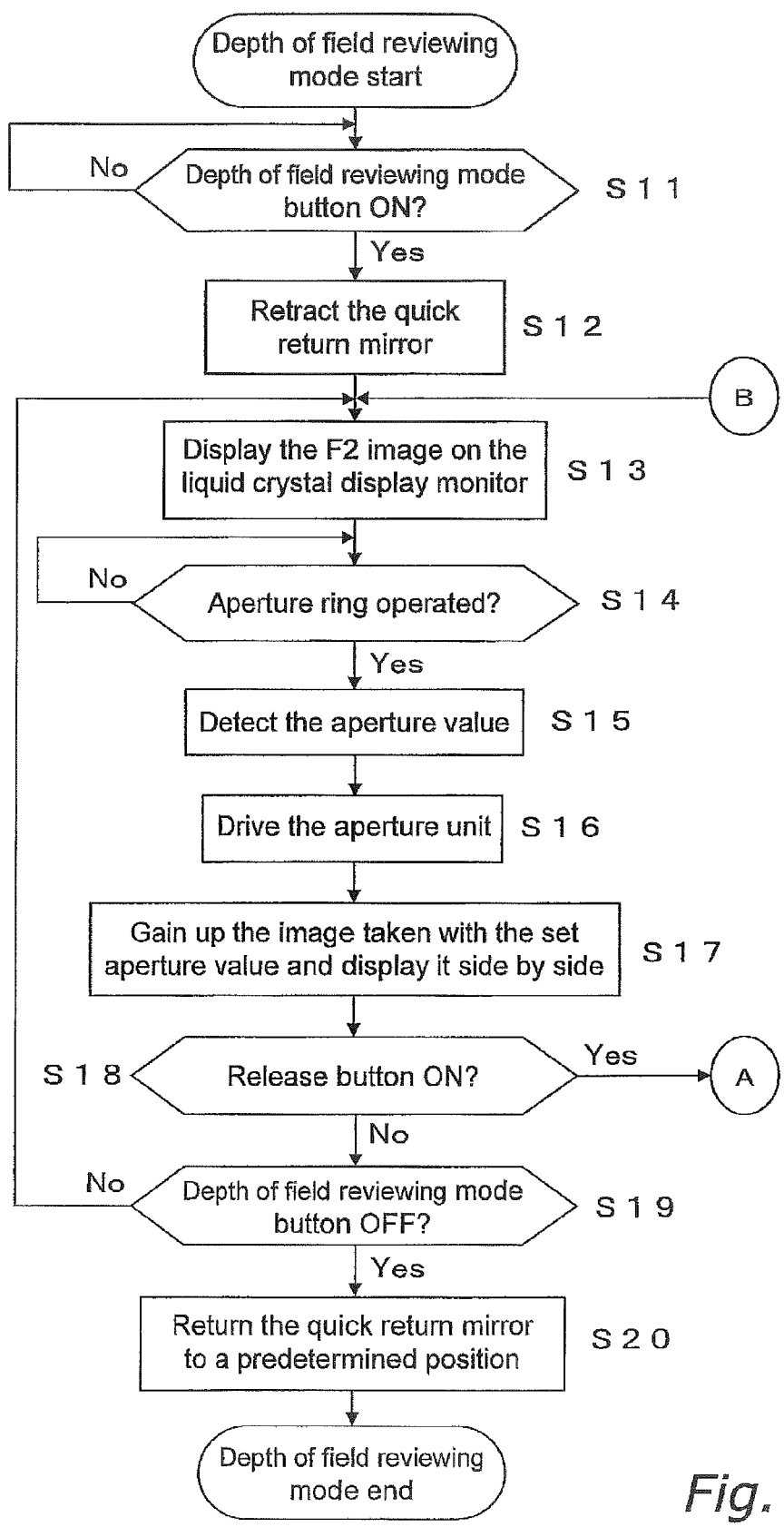
FIG. 14 is a flowchart of a depth of field reviewing mode (second embodiment)
Figure 15:
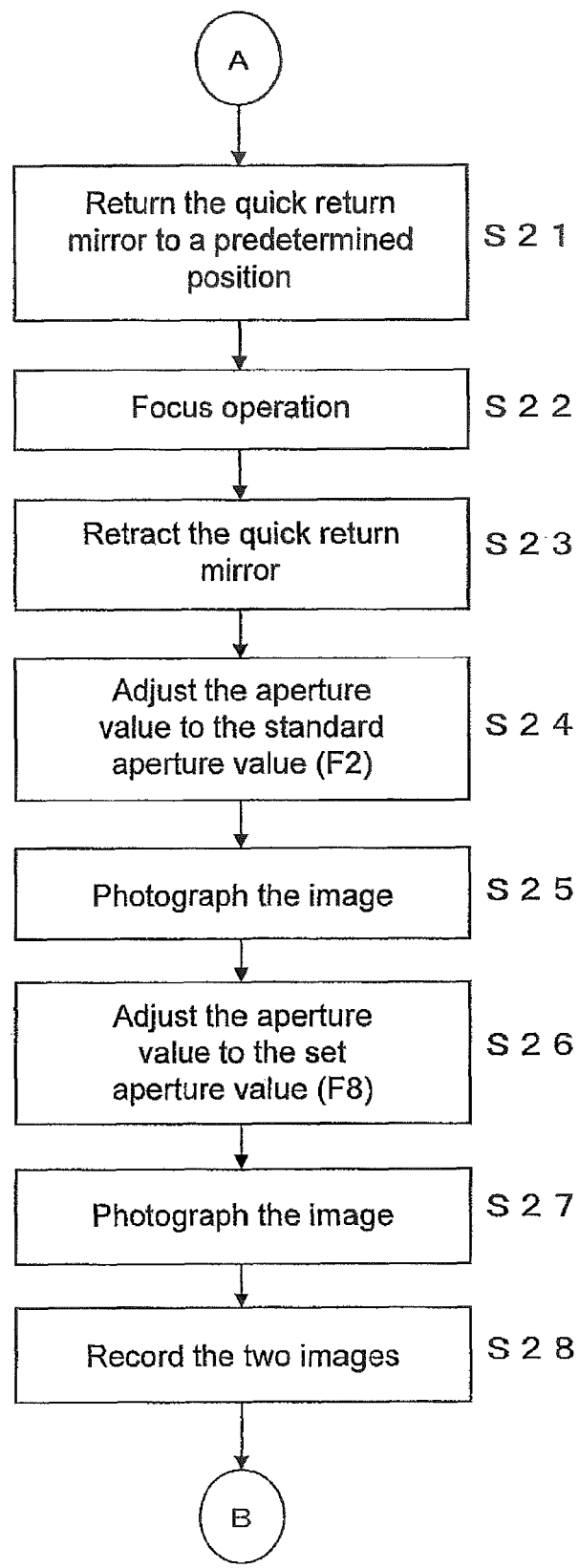
FIG. 15 is a flowchart of the depth of field reviewing mode (second embodiment)
Figure 16:
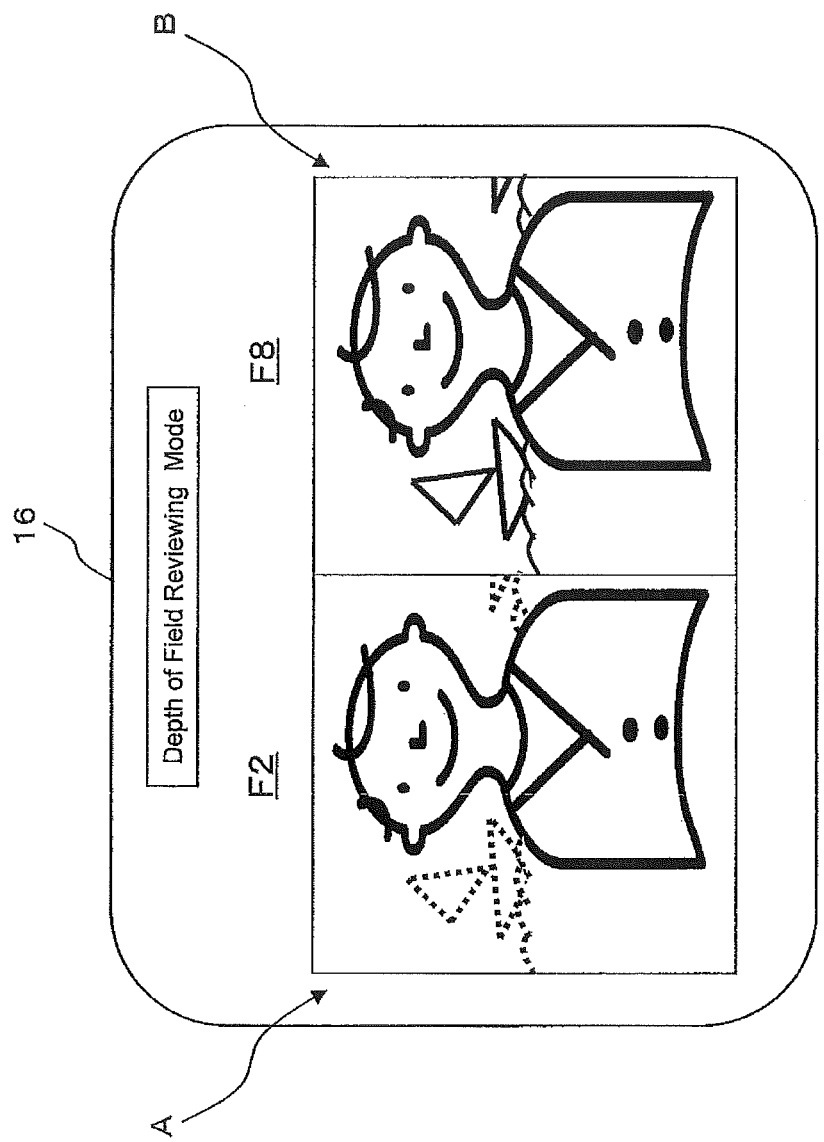
FIG. 16 is an example of an image displayed on the liquid crystal display monitor (second embodiment)

In the above described embodiment, only one image is displayed on the liquid crystal display monitor 16. However, it is also possible to have a configuration in which images obtained with different aperture values are displayed side by side on the liquid crystal display monitor 16. Here, specific operations of the depth of field reviewing mode according to a second embodiment will be described using FIGS. 14 to 16. FIGS. 14 and 15 are flowcharts of the depth of field reviewing mode according to the second embodiment. FIG. 16 is a displaying example of the liquid crystal display monitor 16. In addition, the configuration in the second embodiment is basically the same as the configuration in the first embodiment. Therefore, the description thereof is omitted, and portions that are different will be described mainly.

As shown in FIG. 14, whether or not the depth of field reviewing mode button 76 is pressed is determined by the body microcomputer 12 (S11). If the depth of field reviewing mode button 76 is pressed, it is changed to the depth of field reviewing mode (S12). As shown in FIG. 11, in the depth of field reviewing mode, the quick return mirror drive motor 44 is driven by the quick return mirror control unit 43, and the quick return mirror 4 retracts outside of the optical path X. After the retraction of the quick return mirror 4, the operation of the imaging sensor 11 starts.

Here, an image as the standard for comparing the depths of field is automatically obtained. More specifically, as shown in FIG. 16, a portion of an image with aperture value of F2 obtained by the imaging sensor 11 is displayed as standard image A on the left side of the liquid crystal display monitor 16 based on a command from the image displaying control unit 15 (S13). The aperture value at this time is, for example, the standard aperture value set in advance by the body microcomputer 12. This standard aperture value is the brightest aperture value (aperture in the most opened state) in the interchangeable lens unit 2, and the depth of field is the shallowest. Therefore, the standard image A is the image in which the background is out of focus with respect to the figure captured in the middle. The standard image A is temporarily stored by the buffer memory 54, and the state of it being displayed on the liquid crystal display monitor 16 by the image displaying control unit 15 is maintained.

Next, if the user operates the aperture ring 40, the aperture information based on the rotational angle of the aperture ring 40 is detected by the aperture control unit 27, based on a command from the lens microcomputer 20 (S14, S15). A drive signal for driving the aperture drive motor 28b is generated by the aperture control unit 27 based on a control signal from the lens microcomputer 20, and the aperture blade of the aperture unit 28 is driven by the aperture drive motor 28b (S16). As a result, the aperture value of the imaging optical system L is changed to the aperture value (set aperture value) set by the aperture ring 40. For example, if the set aperture value by the aperture ring 40 is F8, the real-time image of F8 set at the aperture ring 40 is displayed as a comparative image B on the right side of the liquid crystal display monitor 16 (S17). At this time, same as the above described first embodiment, the image signal of the comparative image B is gained up by the AGC unit 59. Since the comparative image B is an image with an aperture value of F8, it is an image with a depth of field that is deep, with both the figure in the middle and the background focused, compared to the standard image A.

Here, if the release button 30 is being pressed all the way down, the photographing mode changes to the action mode (S18). More specifically, as shown in FIG. 15, the quick return mirror 4 is returned to a predetermined position on the optical path X, and the focus operation is performed (S21, S22). Next, the quick return mirror 4 retracts outside of the optical path X (S23), and the aperture value is adjusted to the standard aperture value F2 (S24). More specifically, the aperture blade of the aperture unit 28 is driven so that the aperture value becomes the set aperture value F2, and an image with an aperture value of F2 is photographed (S25).

Next, the aperture value is set to the set aperture value F8 (S26). More specifically, the aperture blade of the aperture unit 28 is driven so that the aperture value becomes F8, and an image with an aperture value of F8 is photographed (S27). Through these steps, two images with different depths of field are continuously taken, and the two images are recorded in the internal memory and/or the recording media, based on a command of the image recording control unit 17 (S28). When this action mode ends, the depth of field reviewing mode, from Step S13 shown in FIG. 14, is restarted.

On the other hand, if the release button 30 is not pressed all the way down, whether or not the depth of field reviewing mode button 76 is OFF is determined by the body microcomputer 12 (S18, S19). If it is not OFF, Steps 13 to 18 are repeated (S19). If the depth of field reviewing mode button 76 is switched to OFF, the quick return mirror 4 is returned to a predetermined position on the optical path X, and the depth of field reviewing mode ends (S20).

In this way, in the depth of field reviewing mode of this embodiment, since the standard image A and the comparative image B are displayed side by side on the liquid crystal display monitor 16, it is possible to compare images with different depths of field side by side. As a result, it becomes easy for the user to grasp the difference in the images due to the difference in the aperture values.

In addition to that, same as the above described first embodiment, the image signal of the comparative image B is gained up by the AGC unit 59. Therefore, it is possible to have the brightness of the standard image A and the comparative image B to be approximately the same, regardless of the aperture values. By doing so, when comparing a plurality of images side by side, the user can easily check the depths of field of the images, without being affected by the difference in the brightness.

In addition, in the action mode, it is possible to continuously take images with different depths of field, while looking at images corresponding to the aperture values at the time of actually photographing, or the actual aperture images. Therefore, it is possible to simplify the setting of photographing conditions and the like, and it is possible to expand the photographing range of the user.

Other Embodiments

The specific configurations of the present invention are not limited to those in the embodiments described previously, and various modifications and corrections are possible within the range not deviating from the substance of the invention.

(1)

Figure 17:
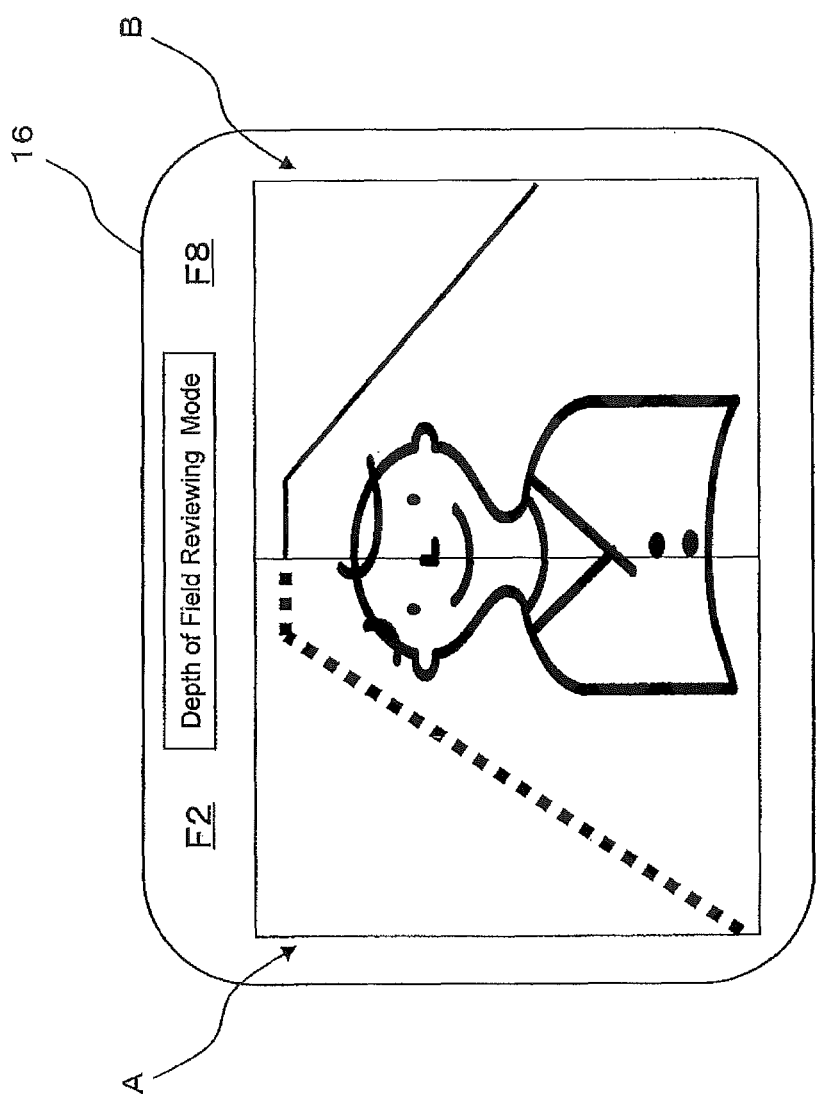
FIG. 17 is an example of an image displayed on the liquid crystal display monitor (other embodiment)

In the above described second embodiment, two images with different depths of field are displayed side by side on the liquid crystal display monitor 16. However, the displaying format of the images is not limited to that in the embodiment described above. For example, the case that, as shown in FIG. 17, in the display region of the display monitor 16, one image is divided into left and right in the middle of the figure, and the left half of the standard image A, which is temporarily stored, with the standard aperture value of F2 is displayed on the left side of the display region, and the right half of the comparative image B with the set aperture value of F8 is displayed on the right side of the display region, as the live image, is also possible. Same as the case in the second embodiment described above, the comparative image B is the real-time image obtained with the set aperture value.

In addition, in the above described second embodiment, two images are displayed side by side on the liquid crystal display monitor 16, and two images are continuously taken in the action mode. However, the number of images displayed and the images continuously taken is not limited to two, and it may be three or more.

In addition, photographing is not limited to continuous shooting, and either the standard image A or the comparative image B may be photographed.

In addition, the standard aperture value and the set aperture value are not limited to F2 and F8 described above.

(2)

In the embodiment described above, the aperture value is changed using the aperture ring 40 equipped in the interchangeable lens unit 2. However, it is also possible to have a case in which the aperture ring 40 is not equipped in the interchangeable lens unit 2. In this case, for example, the aperture value is changed using a dial and the like equipped in the camera body 1. The dial equipped in the camera body 1 does not have to be a dial exclusively used for setting the aperture value. For example, other than setting the aperture value, it may include other functions.

(3)

In the embodiment described above, the image obtained by the imaging sensor 11 is displayed on the liquid crystal display monitor 16. However, instead of the imaging sensor 11, it may be configured with another imaging sensor arranged on the viewfinder optical system 19, and the image may be obtained by this imaging sensor. In this case, it is not necessary to retract the quick return mirror outside the optical path X.

In addition, the configuration and the arrangement of the quick return mirror 4 and the viewfinder optical system 19 are not limited to those in the first and the second embodiments described above.

(4)

In the embodiment described above, the photographing mode is changed to the depth of field reviewing mode if the depth of field reviewing mode button 76 is pressed once, and the depth of field reviewing mode is cancelled if it is pressed again. However, the configuration may be to have the depth of field reviewing mode continue only while the depth of field reviewing mode button 76 is being pressed.

(5)

In the embodiment described above, the focus detection system is the phase difference detection system used the focus detection unit 5. However, the focus detection system may be, for example, a contrast detection system used the imaging sensor 11. In this case, for example, processes in Steps S21 and S23 shown in FIG. 15 become unnecessary, and it is possible to reduce the focus operation time.

In addition, in the embodiment described above, the case in which images corresponding to two aperture values are displayed on the liquid crystal display monitor 16 was described. However, it is not limited to this. For example, images corresponding to a plurality, three or more, of aperture values may be displayed as multi-screens on the liquid crystal display monitor 16. At this time, the image which corresponds to the aperture value when the aperture is in the opened state may be constantly displayed on a specific display region on the liquid crystal display monitor 16, and a plurality of images which correspond to aperture values other than the aperture value when the aperture is in the opened state may be displayed in other display regions respectively.

(6)

In the embodiment described above, the gain up treatment is performed by the AGC unit 59 of the analog signal processing unit 51. However, it is also possible to adjust the brightness of an image according to the aperture value by increasing the sensitivity of the imaging sensor 11 through the analog signal processing unit 51 and the like. In addition, a treatment equivalent to the gain up treatment may be performed by a portion other than the analog signal processing unit 51.

(7)

In the embodiment described above, a camera system using a single-lens reflex digital camera as an example is described. However, it is also possible to apply this camera system to a digital camera other than the single-lens reflex type, if it includes an aperture value alteration function.

(8)

The coordinate axes and the directions used in the description above are not for limiting the state of use of the camera system 100.

Additional Statement

The present invention can also be expressed in the following way.

1: Content of the Additional Statement

Additional Statement 1

An imaging device including an observation optical system having a movable reflecting mirror arranged between an imaging optical system and an image pickup device, and observes a light reflected by the reflecting mirror, the imaging device comprising:

a reflecting mirror drive unit for driving the reflecting mirror;

a first photographing mode in which the reflecting mirror is driven to a first state so that a light passed through the imaging optical system is reflected by the reflecting mirror and led to the observation optical system, and performs photographing;

a second photographing mode in which the reflecting mirror is driven to a second state so that a light passed through the imaging optical system is led to the image pickup device, and performs photographing;

an image processing unit for changing the gain on a captured image;

an image displaying unit for displaying the captured image; and a preview operation unit in which, by being operated, the imaging optical system is controlled to a real aperture state and changes to the second photographing mode, and along with this, the captured image is displayed on the displaying unit in a state where the gain thereof is enlarged by the image processing unit.

Additional Statement 2

An imaging device including an observation optical system having a movable reflecting mirror arranged between an imaging optical system and an image pickup device, and observes a light reflected by the reflecting mirror, the imaging device comprising:

a reflecting mirror drive unit for driving the reflecting mirror;

a first photographing mode in which the reflecting mirror is driven to a first state so that a light passed through the imaging optical system is reflected by the reflecting mirror and led to the observation optical system, and performs photographing;

a second photographing mode in which the reflecting mirror is driven to a second state so that a light passed through the imaging optical system is led to the image pickup device, and performs photographing;

an image processing unit for changing the gain on a captured image;

an image displaying unit for displaying the captured image;

a preview operation unit in which, by being operated, the imaging optical system is controlled to a first aperture state and changes to the second photographing mode, and along with this, the captured image is displayed on the displaying unit in a state where the gain thereof is enlarged by the image processing unit;

an aperture alteration unit for changing the aperture value of the optical system; and an image displaying control unit for displaying an image data in a second real aperture state different from the first real aperture state by operating the aperture alteration unit in a state where the preview operation unit is operated, simultaneously with an image data in the first aperture state, on the image displaying unit.

Additional Statement 3

The imaging device according to Additional Statement 2, comprising a captured image in the first real aperture state, and an image recording unit for recording the captured image in the second real aperture state.

2: Description of the Additional Statements

The invention described in Additional Statement 1 is an imaging device including an observation optical system having a movable reflecting mirror arranged between an imaging optical system and an image pickup device, and observes a light reflected by the reflecting mirror. The imaging device includes a reflecting mirror drive unit for driving the reflecting mirror; a first photographing mode in which the reflecting mirror is driven to a first state so that a light passed through the imaging optical system is reflected by the reflecting mirror and led to the observation optical system, and photographing is performed; a second photographing mode in which the reflecting mirror to a second state so that a light passed through the imaging optical system is led to the image pickup device, and photographing is performed; an image processing unit for changing the gain on a captured image; an image displaying unit for displaying the captured image; and a preview operation unit in which, by being operated, the imaging optical system is controlled to a real aperture state and changes to the second photographing mode, and along with this, the captured image is displayed on the displaying unit in a state where the gain thereof is enlarged by the image processing unit.

The invention described in Additional Statement 2 is an imaging device comprising a reflecting mirror drive unit for driving a reflecting mirror; a first photographing mode in which the reflecting mirror is driven to a first state so that a light passed through an imaging optical system is reflected by the reflecting mirror and led to an observation optical system, and photographing is performed; a second photographing mode in which driving the reflecting mirror to a second state so that a light passed through the imaging optical system is led to an image pickup device, and performs photographing; an image processing unit for changing the gain on a captured image; an image displaying unit for displaying the captured image; a preview operation unit in which, by being operated, the imaging optical system is controlled to a first aperture state and changes to the second photographing mode, and along with this, the captured image is displayed on the displaying unit in a state where the gain thereof is enlarged by the image processing unit; an aperture alteration unit for changing the aperture value of the optical system; and an image displaying control unit for displaying an image data in a second real aperture state different from the first real aperture state by operating the aperture alteration unit in a state where the preview operation unit is operated, simultaneously with an image data in the first aperture state, on the image displaying unit.

The invention described in Additional Statement 3 is an imaging device characterized in comprising a captured image in a first real aperture state, and an image recording unit for recording the captured image in a second real aperture state.

INDUSTRIAL APPLICABILITY

In the camera system according to the present invention, it is possible to display even images with different aperture values to approximately the same brightness. Therefore, it is useful in the field of the digital camera comprising an aperture value alteration function.

The invention claimed is:

1. A camera system for photographing a subject, the camera system comprising:
    an imaging optical system configured to form an optical image of the subject;
    an imaging unit configured to convert the optical image into an image signal, and obtain an image of the subject;
    an image recording unit configured to store the image signal into a memory;
    a movable reflecting mirror configured to be in a first state of being positioned in an optical path extending from the imaging optical system to the imaging unit or in a second state of being retracted from the optical path;
    a reflecting mirror drive unit configured to drive the reflecting mirror;
    an aperture adjustment unit configured to adjust an aperture value of the imaging optical system;
    an aperture value input unit to which an aperture value for an aperture of the imaging optical system can be input;
    a display unit configured to display the image;
    an image adjustment unit configured to adjust a brightness of the image displayed on the display unit according to the aperture value;
    a release button for starting the photographing of the subject; and
    a control unit, wherein:
    the imaging unit performs focusing by detecting contrast in the image of the subject, and
    while the reflective mirror drive unit keeps the reflecting mirror in the second state, the image adjustment unit increases the brightness of the image displayed on the display unit when the aperture adjustment unit changes the aperture value of the imaging optical system to a larger aperture value input by the aperture value input unit, and by operation of the release button, the imaging unit performs the focusing, and then the photographing of the subject is started.

2. The camera system according to claim 1, wherein the image displayed on the display unit in the depth of field reviewing mode is a real-time image.

3. The camera system according to claim 1, wherein when the image is displayed on the display unit in the depth of field reviewing mode, the image adjustment unit amplifies the image signal according to the aperture value.

4. The camera system according to claim 3, wherein the image adjustment unit amplifies the image signal based on information on the relationship between the aperture value and an amplification factor of the image signal.

5. The camera system according to claim 1, wherein, in the depth of field reviewing mode, the display unit is configured to display a standard image obtained with a standard aperture value set in advance, and a comparative image obtained with a set aperture value set in the aperture value input unit, side by side, based on operating the preview operation unit.

6. The camera system according to claim 1, wherein in the depth of field reviewing mode, the display unit is configured to display a standard image obtained with a standard aperture value set in advance, and a comparative image obtained with a set aperture value set in the aperture value input unit, side by side, and when the aperture value for obtaining the standard image differs from the aperture value for obtaining the comparative image, the image adjustment unit sets the amplification factor for an image signal of the standard image and the amplification factor for an image signal of the comparative image to be different from each other.

7. The camera system according to claim 5, further comprising:

an operation unit to which information can be input from the outside; and an image recording unit for recording the image, wherein, the standard image and comparative image are recorded in the image recording unit based on information inputted from the operation unit.

8. The camera system according to claim 1, wherein the reflecting mirror drive unit puts the reflecting mirror into the second state.

9. A camera system for photographing a subject, the camera system comprising:

an imaging optical system configured to form an optical image of the subject;

a reflecting mirror movable between a first position at which the reflecting mirror is positioned on an optical axis of the imaging optical system and a second position at which the reflecting mirror is retracted from the optical path;

an imaging unit configured to convert the optical image into digital data corresponding to the optical image when the reflecting mirror is at the second position;

an aperture adjustment unit which adjusts an aperture value of the imaging optical system;

a display unit configured to display an image reproduced from the digital data;

an image adjustment unit configured to adjust a brightness of the image displayed on the display unit according to the aperture value;

a release button for starting the photographing of the subject; and a control unit, wherein:

the image unit performs focusing by detecting contrast in the image of the subject, and while the reflecting mirror is kept in the second position, the image adjustment unit increases the brightness of the image displayed on the display unit when the aperture adjustment unit changes the aperture value of the imaging optical system to a larger aperture value, and by operation of the release button, the imaging unit performs the focusing, and then the photographing of the subject is started.

* * * * *